United States Patent [19]
Hagiwara

[11] Patent Number: 5,734,930
[45] Date of Patent: Mar. 31, 1998

[54] OPTICAL APPARATUS HAVING A VISUAL AXIS DETECTOR

[75] Inventor: Shinichi Hagiwara, Yokohama, Japan

[73] Assignee: Canon Kabushiki Kaisha, Tokyo, Japan

[21] Appl. No.: 541,722

[22] Filed: Oct. 10, 1995

Related U.S. Application Data

[63] Continuation of Ser. No. 429,022, Apr. 26, 1995, abandoned, which is a continuation of Ser. No. 114,965, Sep. 2, 1993, abandoned.

[30] Foreign Application Priority Data

| Sep. 4, 1992 | [JP] | Japan | 4-237432 |
| Sep. 4, 1992 | [JP] | Japan | 4-237433 |
| Sep. 4, 1992 | [JP] | Japan | 4-260588 |

[51] Int. Cl.$^6$ ............ G03B 7/08; G03B 13/36; G03B 17/20
[52] U.S. Cl. ............ 396/50; 396/51; 396/123; 396/147; 396/234; 396/296
[58] Field of Search ............ 354/402, 409, 354/471, 62, 410, 219, 403, 474; 348/78; 351/210, 211; 396/50, 51, 121, 122, 123, 147, 233, 234, 287, 296

[56] References Cited

U.S. PATENT DOCUMENTS

| 5,036,347 | 7/1991 | Tsunekawa et al. | 354/219 X |
| 5,144,358 | 9/1992 | Tsuru et al. | 354/403 |
| 5,182,443 | 1/1993 | Suda et al. | 354/219 X |
| 5,214,466 | 5/1993 | Nagano et al. | 354/402 |
| 5,225,862 | 7/1993 | Nagano et al. | 354/219 X |
| 5,245,371 | 9/1993 | Nagano et al. | 354/62 |
| 5,245,381 | 9/1993 | Takagi et al. | 354/471 |
| 5,253,008 | 10/1993 | Konishi et al. | 354/402 |
| 5,260,734 | 11/1993 | Shindo | 354/219 |
| 5,280,312 | 1/1994 | Yamada et al. | 351/211 |
| 5,296,888 | 3/1994 | Yamada | 354/402 |
| 5,298,927 | 3/1994 | Konishi et al. | 351/211 |
| 5,396,253 | 3/1995 | Chia | 342/104 |
| 5,422,700 | 6/1995 | Suda et al. | 354/402 |
| 5,455,654 | 10/1995 | Suzuki | 354/402 |

FOREIGN PATENT DOCUMENTS

| 1-274736 | 11/1989 | Japan . |
| 2-64513 | 3/1990 | Japan . |
| 2-422 | 1/1992 | Japan . |
| 4-242630 | 8/1992 | Japan . |

*Primary Examiner*—W. B. Perkey
*Attorney, Agent, or Firm*—Fitzpatrick, Cella, Harper & Scinto

[57] ABSTRACT

An optical apparatus having predetermined functions includes a visual-axis detecting device for detecting the direction of the visual axis of an operator, a posture detecting device for detecting the posture of the optical apparatus, and a control device for causing the predetermined functions to be performed in accordance with an output from the visual-axis detecting device and for causing the predetermined functions to be performed by using a predetermined algorithm in accordance with an output from the visual-axis detecting device when the visual-axis detecting device is disallowed to operate.

46 Claims, 26 Drawing Sheets

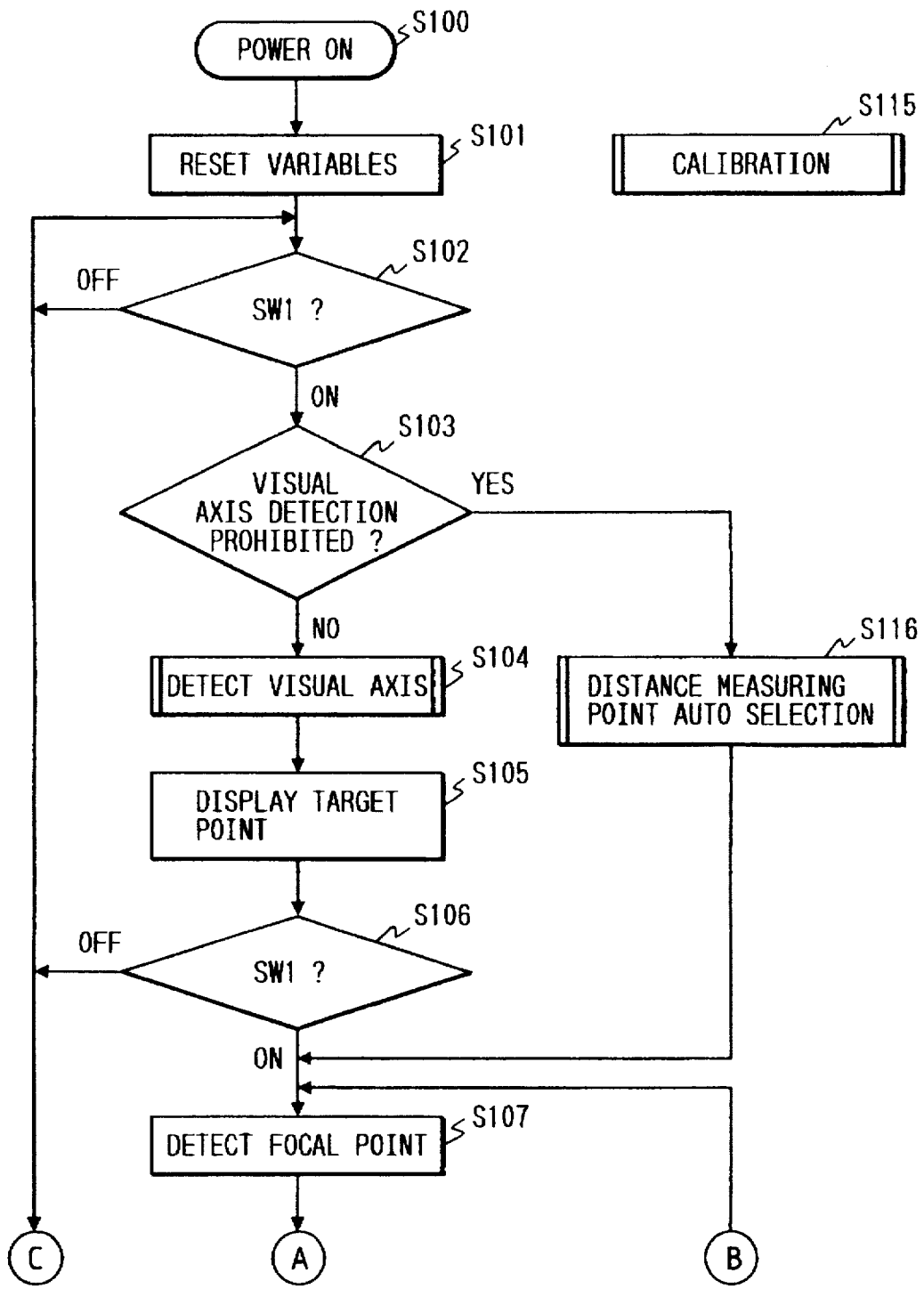

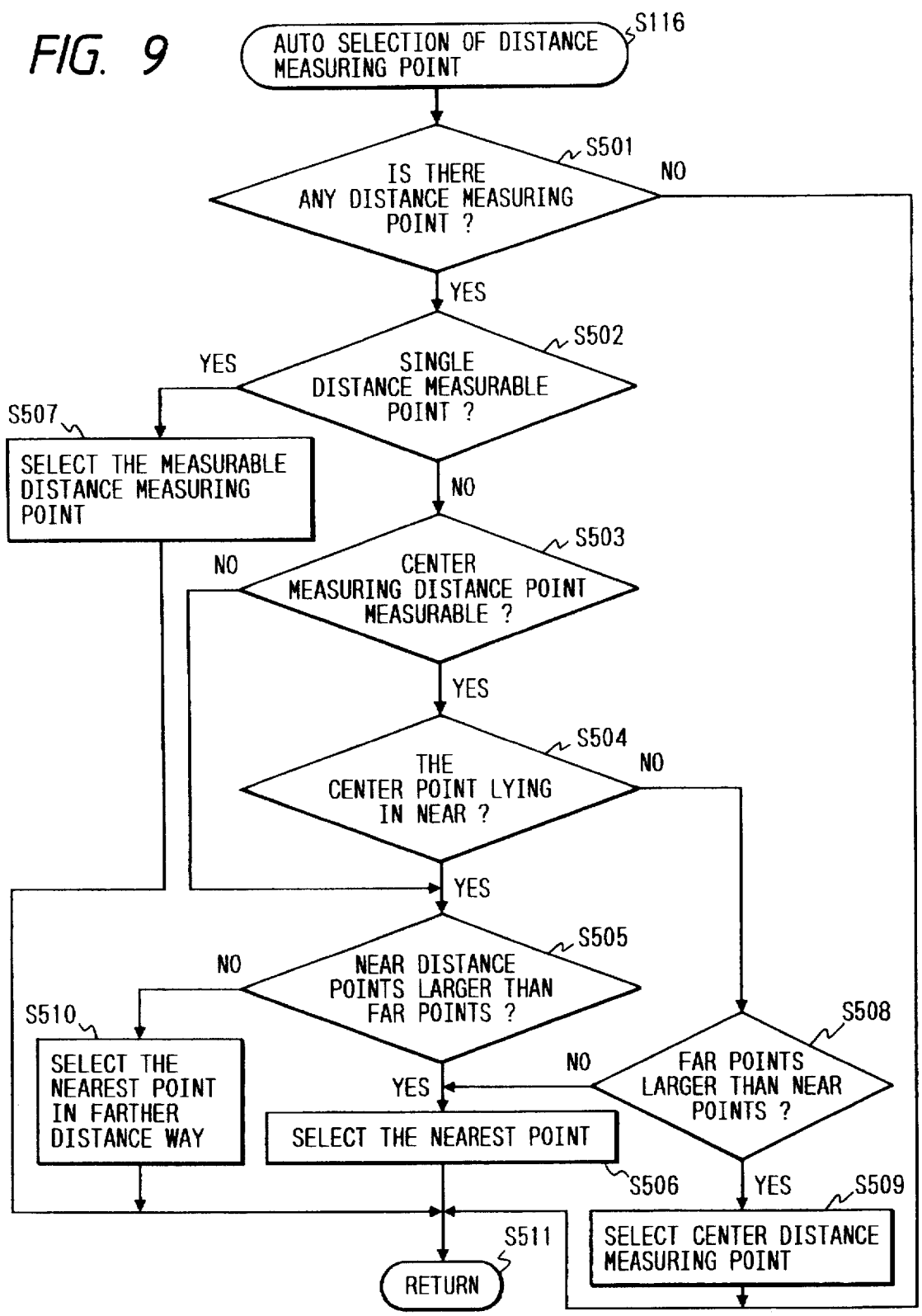

OPTICAL APPARATUS HAVING A VISUAL AXIS DETECTOR

This application is a continuation of application Ser. No. 08/429,022, filed Apr. 26, 1995, now abandoned, which is a continuation of application Ser. No. 08/114,965, filed Sep. 2, 1993, now abandoned.

BACKGROUND OF THE INVENTION

1. Field of the Invention

The present invention relates to an optical apparatus, such as a film camera, a video camera or an observation apparatus, having a visual-axis detector, such optical apparatus detecting the line of vision (visual axis) of a photographer who observes an object through a finder, by using an image reflected from the eye ball of the photographer, which is obtained by illuminating the eye ball surface.

2. Related Background Art

Various apparatuses (e.g., eye cameras) for detecting "a position on an observed surface", what is commonly called a line of vision (visual axis), have hitherto been proposed. In a method of detecting the line of vision, disclosed in, for example, Japanese Patent Appln. Laid-Open No. 1-274736, a bundle of parallel rays from a light source is projected to the front eye portion of the eye ball of an observer, and a cornea reflected image, produced by light reflected from the cornea, and the position of the image are used to determine the visual axis. Also, in Japanese Patent Appln. Laid-Open No. 4-242630 (corresponding to Japanese Application No. 3-11492), a camera having a line of vision detector carried therein has been proposed. Further, a line-of-vision calibration method of compensating for individual differences in the line of vision of an observer has been disclosed.

FIG. 22 is a schematic view of the essential portion of an eye ball image, illustrating a method of detecting a line of vision. In the figure, reference numerals 13a and 13b denote light sources, such as light-emitting diodes, which emit infrared rays invisible to an observer, such light sources being arranged nearly symmetrical about the optical orientation of a light receiving lens along the x orientation and divergently illuminating the eye ball of the observer. A part of the illumination light reflected by the eye ball is condensed to an image sensor 14 by a light receiving lens 12. FIG. 23A is a schematic view of an eye ball image projected on the image sensor 14. FIG. 23B illustrates the intensity of the output of the image sensor 14. A method of detecting the visual axis will be explained below with reference to the figures.

An infrared ray emitted from the light source 13b illuminates a cornea 16 of an eye ball 15. A cornea reflected image "d" (virtual image) formed by a part of the infrared ray reflected by the surface of the cornea 16 is condensed by the light receiving lens 12, forming an image on a position d' on the image sensor 14. Similarly, an infrared ray emitted from the light source 13a illuminates the cornea 16 of the eye ball. At this time, a cornea reflected image "e" formed by a part of the infrared ray reflected by the surface of the cornea 16 is condensed by the light receiving lens 12, forming an image on a position e' on the image sensor 14.

A bundle of rays from end portions a and b of an iris 17 is formed through the light receiving lens 12 into an image of the end portions a and b at positions a' and b' on the image sensor 14. When the rotational angle θ of the optical axis of the eye ball 15 in relation to the optical axis of the light receiving lens 12 is small, the coordinate $x_c$ of the central position c of a pupil 19, if the x coordinates of the end portions a and b of the iris 17 are denoted as $x_a$ and $x_b$, can be expressed as follows:

$$x_c \approx (x_a + x_b)/2.$$

Since the X coordinate of the middle position between the cornea reflected images "d" and "e" nearly matches the x coordinate $x_o$ of the curvature center O of the cornea 16, when the x coordinates of the positions d and e at which the cornea reflected image are denoted as $x_d$ and $x_e$, a standard distance from the curvature center O of the cornea 16 to the center C of the pupil 19 is denoted as [OC], and a coefficient in which individual differences with respect to the distance [OC] is taken into consideration is denoted as A, the rotational angle θ of the optical axis of the eye ball 15 nearly satisfies the relation shown below:

$$(A \times [OC]) \times \sin\theta \approx x_c - (x_d + x_e)/2 \qquad (1)$$

Therefore, if the positions of each feature point (the cornea reflected images "d" and "e", and the end portions a and b of the iris) of the eye ball 15 projected onto the image sensor 14 as shown in FIG. 22 are detected, the rotational angle θ of the optical axis of the eye ball 15 can be determined. At this time, equation (1) can be rewritten as:

$$\beta \times (A \times [OC]) \times \sin\theta \approx (x_a' + x_b')/2 - (x_d' + x_e')/2 \qquad (2)$$

where β is the magnification factor determined by the position of the eye ball with respect to the light receiving lens 12, which magnification factor is substantially determined as a function of the spacing $|x_d' - x_e'|$ of the cornea reflected images. The rotational angle θ of the optical axis of the eye ball 15 can be rewritten as $$\theta \approx \text{Arc Sin}\{(x_c' - x_f')/\beta/(A \times [OC])\} \qquad (3)$$

where $x_c' \approx (x_a' + x_b')/2$, and $x_f' \approx (x_d' + x_e')/2$.

Since the optical axis of the eye ball of the observer does not match the visual axis, when the horizontal, rotational angle θ of the optical axis of the observer is computed, the horizontal visual axis θx of the observer can be determined by correcting the angular difference α between the optical axis and the visual axis of the eye ball. If the coefficient, which takes into consideration the individual differences in the correction angle "a" between the optical axis and the visual axis of the eye ball is denoted as B, the horizontal visual axis θx of the observer can be determined as follows:

$$\theta x = \theta \pm (B \times \alpha) \qquad (4)$$

where, if the rotational angle to the right (as seen by the observer), a + sign is selected when the observer uses his left eye, excluding the observation apparatus, and a − sign is selected when the observer uses his right eye. Although an example in which the eye ball of the observer rotates in a z-x plane (e.g., a horizontal plane) is shown in the figure, detection of the position is also possible when the eye ball of the observer rotates in a y-z plane (e.g., a vertical plane). However, since the vertical components of the eye ball of the observer match the vertical components θ' of the optical axis of the eye ball, the vertical visual axis θy becomes as follows:

$$\theta y = \theta'.$$

Further, in a single-lens reflex camera, a position $(x_n, y_n)$ on the focusing screen that the observer sees can be determined on the basis of visual axis data θx and θy:

$$x_n \approx m \times \theta x \approx m \times [\text{Arc Sin}\{(x_c' - x_f')/\beta/(A \times [OC])\} \pm (B \times \alpha)] \qquad (5)$$

$$y_n \approx m \times \theta y$$

where m is a constant determined by the finder optical system of the camera. Since the coefficients for correcting the individual differences of the visual axis, or individual difference correction coefficients, are of two kinds, A and B, if the observer is shown two visual marks at different positions, the coefficients A and B can be determined by computing the rotational angles of the eye ball of the observer. If the obtained visual-axis individual difference correction coefficient of the observer or photographer is substituted for equation (5), visual axis correcting means for correcting visual-axis detection errors, the position on the focusing screen, of the visual axis of the photographer, who views through the finder of the camera, can be correctly computed.

However, when the eye ball is optically observed in this way, it may not be possible to see the entire pupil because of the eyelid. As a result, often the accuracy of detecting the center of the pupil is more difficult to realize longitudinally than laterally. However, since the photographic image plane of a camera is generally rectangular, only lateral detection is sufficient for practical purposes, and thus a visual-axis detecting apparatus for detecting the horizontal visual axis is suited for a camera.

However, since this type of visual-axis detecting apparatus has the above-described problems, the detection accuracy cannot help but be decreased due to the attitude of the camera. More specifically, since the aspect ratio of the image plane of a conventional camera is not 1:1, naturally, there is a posture in which the camera is rotated 90 degrees. In this condition, the longitudinal rotation of the eye ball is detected using the position where the visual axis is detected as a reference.

SUMMARY OF THE INVENTION

It is a first object of the present invention to make functions of an optical apparatus to be performed properly regardless of the posture of the optical apparatus.

It is a second object of the present invention to compensate for a decrease in the detection performance of a visual-axis detecting apparatus in an optical apparatus having a visual-axis detecting apparatus.

It is a third object of the present invention to provide a camera comprising a visual-axis detecting apparatus for detecting the rotational angle of the optical axis of the eye ball of a photographer and computing the visual axis of the photographer on the basis of the rotational angle, posture detecting means, and visual-axis correcting means for correcting a detection error of the visual axis because of individual differences in the eye ball, wherein the visual-axis detection by the visual-axis detecting apparatus is disallowed to prevent an erroneous operation of the camera performed on the basis of incorrect visual-axis detection data, and when the visual-axis detection is stopped, the fact is displayed on a display section of the camera, informing the photographer of the fact. In addition, a display pattern for indicating visual-axis detection when it is detected by the visual-axis detecting apparatus that the camera is longitudinally positioned is made different in the visual-axis detecting apparatus when it is detected by the visual-axis detecting apparatus that the camera is not longitudinally positioned.

It is a fourth object of the present invention to provide a camera comprising a visual-axis detecting apparatus for detecting the rotational angle of the optical axis of the eye ball of a photographer and computing the visual axis of the photographer on the basis of the rotational angle, and posture detecting means for detecting the posture of the camera, wherein a method of controlling the camera based on the visual-axis detecting apparatus is changed on the basis of the camera posture information obtained by the posture detecting means depending upon whether the camera is longitudinally positioned or not.

It is a fifth object of the present invention to provide a camera comprising a plurality of photoelectric conversion means for receiving a bundle of rays from a plurality of areas having different object spaces, detecting means for detecting a focal-point detection state of an optical system for a plurality of object areas on the basis of a photoelectric conversion signal from each photoelectric conversion means, posture detecting means for detecting the posture of an optical apparatus with respect to the direction of the gravity, and selecting means for selecting an in-focus state detected by the focal-point detecting means, the in-focus state selected by the selecting means being output as a focal-point detection result.

Other features and advantages of the present invention will be apparent from the following description taken in conjunction with the accompanying drawings, wherein like reference characters designate the same or similar parts throughout the figures thereof.

BRIEF DESCRIPTION OF THE DRAWINGS

FIG. 9 is a flowchart showing an automatic focus-point selection algorithm;

DETAILED DESCRIPTION OF THE PREFERRED EMBODIMENTS

Figure 1:
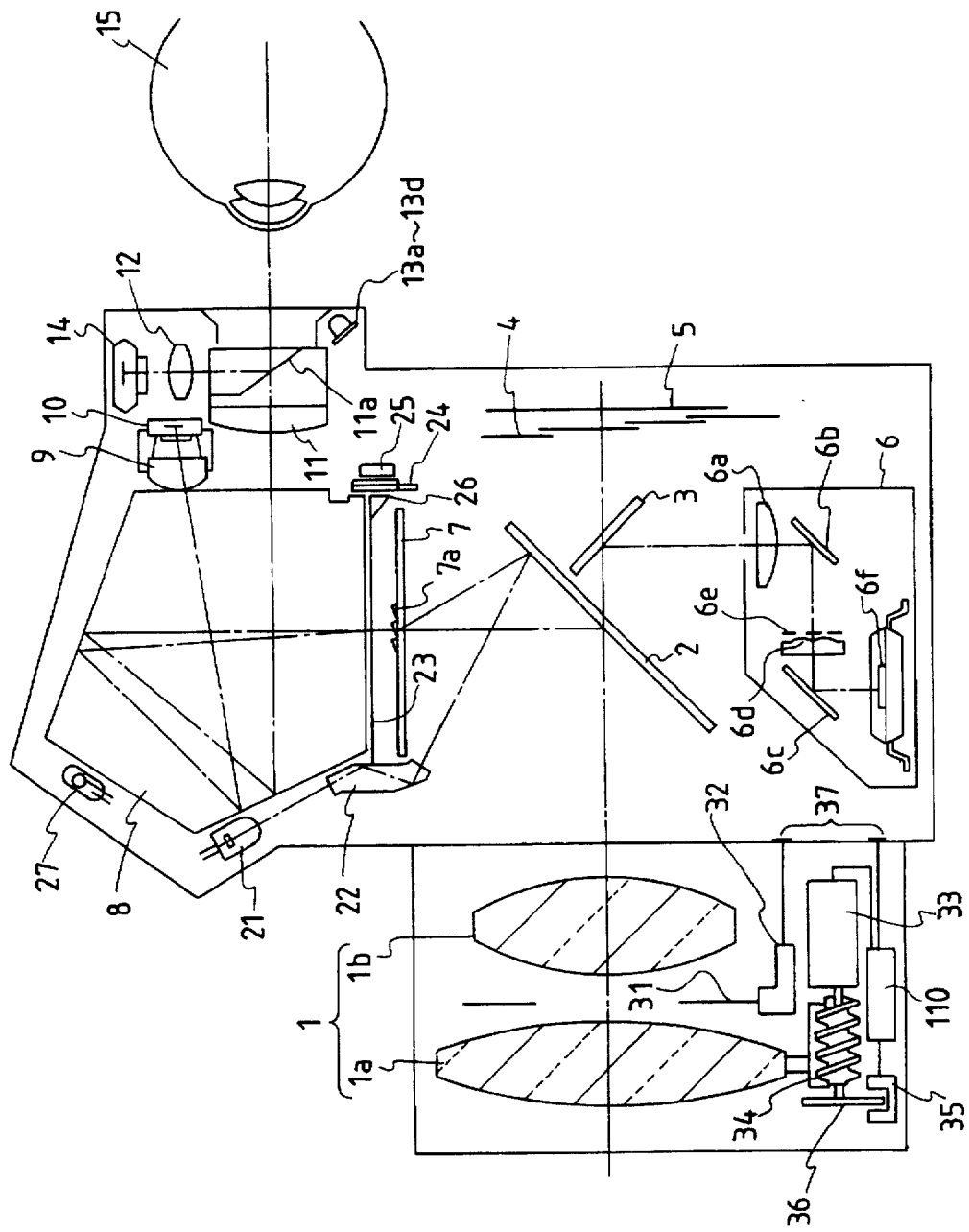
FIG. 1 is an optical sectional view of an embodiment when the present invention is applied to a single-lens reflex camera.
Figure 2A:
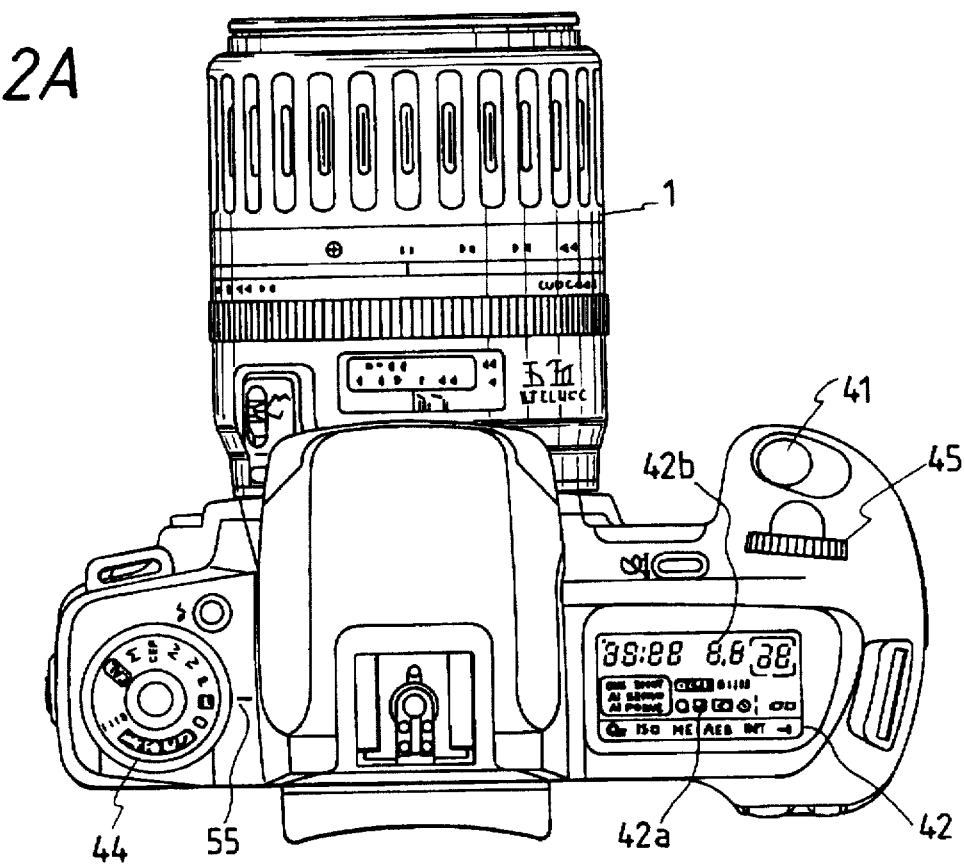
FIGS. 2A and 2B are external views illustrating the essential portion of the single-lens reflex camera shown in FIG. 1.
Figure 2B:
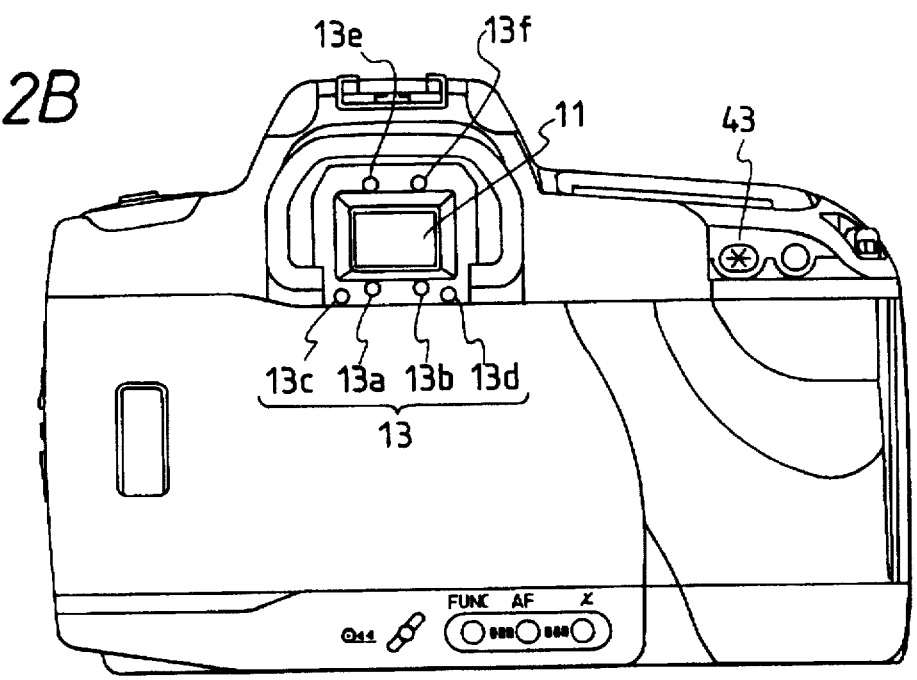
Figure 3:
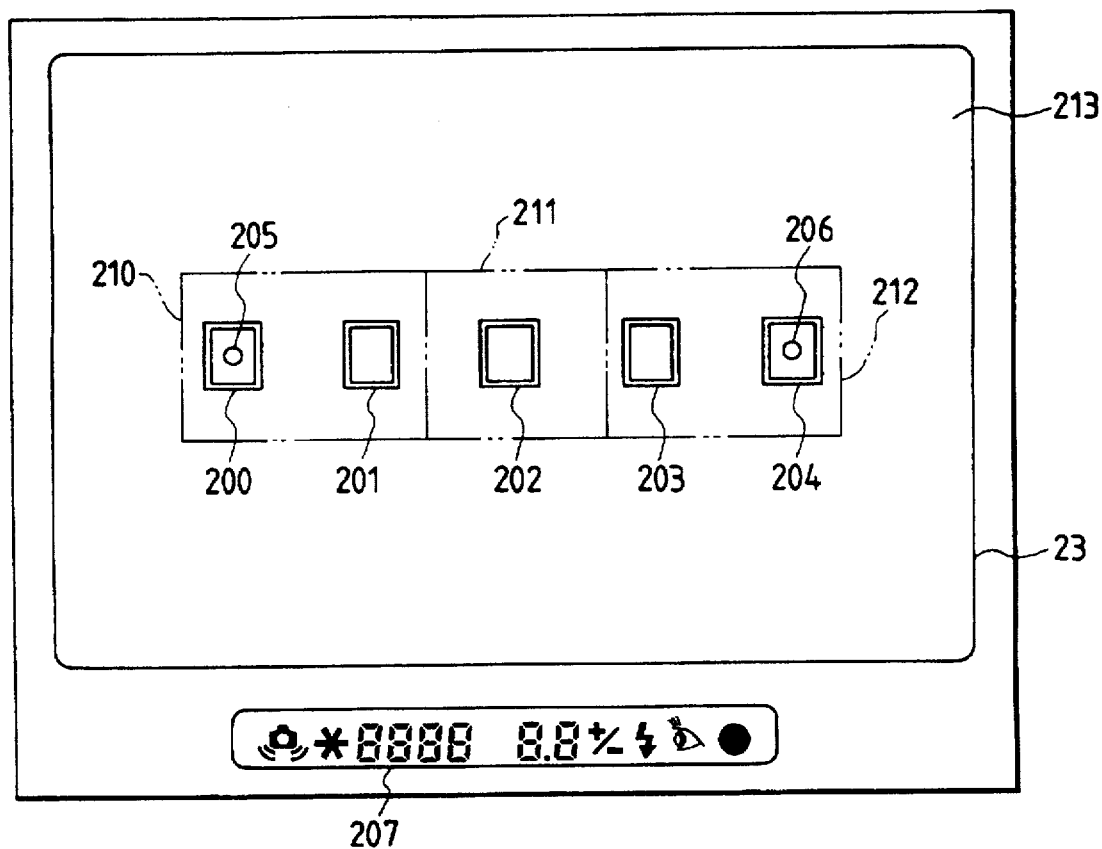
FIG. 3 illustrates the field of view of a finder shown in FIG. 1.

FIGS. 1 to 21 illustrate an embodiment of the present invention. FIG. 1 illustrates a single-lens reflex camera to which the present invention is applied. FIG. 2A is an external view of the upper portion of the single-lens reflex camera. FIG. 2B is a rear view of the single-lens reflex camera. FIG. 3 shows a field of view of the finder of the camera.

Referring to FIGS. 1 to 3, reference numeral 1 denotes a photographic lens. Although the photographic lens is actually formed of a great number of lenses, in FIG. 1, only two lenses 1a and 1b are shown for the sake of convenience, it is. Reference numeral 2 denotes a main mirror which is obliquely positioned or retracted along the photographic light path depending upon the observation or photographing state; reference numeral 3 denotes a sub-mirror for reflecting a bundle of rays which are passed through the main mirror toward the lower portion of the camera body; reference numeral 4 denotes a shutter; reference numeral 5 denotes a photosensitive member formed of a silver halide film, a CCD or a MOS type solid-state imaging element, or a pickup tube, such as a vidicon.

Reference numeral 6 denotes a focal-point detecting apparatus which comprises a field lens 6a arranged close to the imaging forming plane, reflecting mirrors 6b and 6c, a secondary image forming lens 6d, a diaphragm 6e, and a line sensor 6f formed of a plurality of CCDs or BASIS, and which apparatus employs a well-known phase difference method. The focal-point detecting apparatus 6 in the figure is so designed as to detect focal points in a plurality of areas (five focusing marks 200 to 204) in an observation image plane 213, as shown in FIG. 3.

Reference numeral 7 denotes a focusing plane arranged on an image-to-be-formed plane of the photographic lens 1; reference numeral 8 denotes a penta prism for changing the finder light path; and reference numerals 9 and 10 denote an image forming lens and a photometering sensor, respectively, for measuring the brightness of an object within the observation image plane, the image forming lens making the focusing plane 7 and the photometering sensor to be in cooperation with each other through the reflection light path within the penta prism 8.

An eyepiece 11 provided with a light splitter 11a is disposed in the back of the emission surface of the penta prism 8, which eyepiece is used to observe the focusing plane 7 with the eye 15 of the observer. The light splitter 11a is formed of a dichroic mirror which permits visual light to pass and reflect infrared rays, or the like. Reference numeral 12 denotes a light receiving lens; reference numeral 14 denotes an image sensor in which an array of photoelectric elements, such as CCDs, are arranged two-dimensionally, which image sensor is arranged so as to be in cooperation with the vicinity of the pupil of the eye 15 of the photographer at a predetermined position with respect to the light receiving lens 12. The image sensor 14 and the light receiving lens 12 constitute an element of light receiving means. Reference numerals 13, 13a to 13d respectively denote infrared-ray emitting diodes (floodlighting means) which are light sources for illuminating the eye 15 of the photographer. The infrared-ray emitting diodes are arranged around the eyepiece 11, as shown in FIG. 2B.

Reference numeral 21 denotes an LED for superimposing an object at high brightness and making it visible from among bright objects. Light emitted from the superimposing-purpose LED 21 is reflected by a lightflooding prism 22 and the main mirror 2, bent vertically by a very small prism array 7a disposed in the display section of the focusing plane 7, and passed through the penta prism 8 and the eyepiece 11 to reach the eye 15 of the photographer. Thus, the very small prism array 7a is arranged in the form of a frame at a position corresponding to the focal-point detection area of the focusing plane 7. The array 7a is illuminated by five superimposing-purpose LEDs corresponding to each (these LEDs are respectively denoted as LED-L1, LED-L2, LED-C, LED-R1, and LED-R2).

As a result, as can be seen from the finder field-of-vision view shown in FIG. 3, each of the focal point marks 200, 201, 202, 203 and 204 becomes luminous within the finder field-of-vision, each mark displaying a focal-point detection portion (focusing point) (this will hereinafter be referred to as a superimposed display).

Dot marks 205 and 206 are marked in the insides of the focal point marks 200 and 204, respectively, at the right and left ends. These marks are used to indicate visual marks when individual difference correction data (visual-axis correction coefficients) A and B of the eye ball are gathered, (this operation will hereinafter be referred to as a calibration), as described later. Reference numeral 23 denotes a field-of-vision mark for forming a finder field-of-vision area; reference numeral 24 denotes an LCD in the finder for displaying photographic information outside the finder field-of-vision. The LCD is illuminated by an illuminating LED (F-LED) 25, light which is passed through the LCD 24 being guided into the finder by a triangular prism 26, and displayed outside the finder field-of-vision in FIG. 3. The photographer observes the photographic information. Reference numeral 27 denotes visual-axis determining means (a mercury switch) for detecting the posture of the camera.

Reference numeral 31 denotes a diaphragm disposed within the photographic lens 1; reference numeral 32 denotes a diaphragm drive apparatus comprising a diaphragm drive circuit 111 to be described later; reference numeral 33 denotes a motor for driving lenses; reference numeral 34 denotes a lens drive member formed of a drive gear or the like; reference numeral 35 denotes a photocoupler for detecting the rotation of a pulse plate 36 which moves in linkage with the lens drive member 34 and transmitting the rotational force to a lens focusing circuit 110. The lens focusing circuit 110 drives the motor for driving lenses a predetermined amount on the basis of this detected information and information on the lens drive amount from the camera side so that the photographic lens 1 is moved to an in-focus position. Reference numeral 37 denotes a mount contact point which serves as a well-known interface between the camera and the lens.

Referring to FIG. 2A, reference numeral 41 denotes a release button; reference numeral 42 denotes a monitoring LCD which serves as an external monitor display apparatus and is formed of a fixed segment display section 42a for displaying a predetermined pattern and a 7-segment display section 42b for displaying variable numerical values; reference numeral 43 denotes an AE lock button for holding photometered values; and reference numeral 44 denotes a mode dial for selecting a photographic mode or the like. As an explanation of the other operational components is not particularly needed to understand the present invention, such explanation is omitted.

Figure 4A:
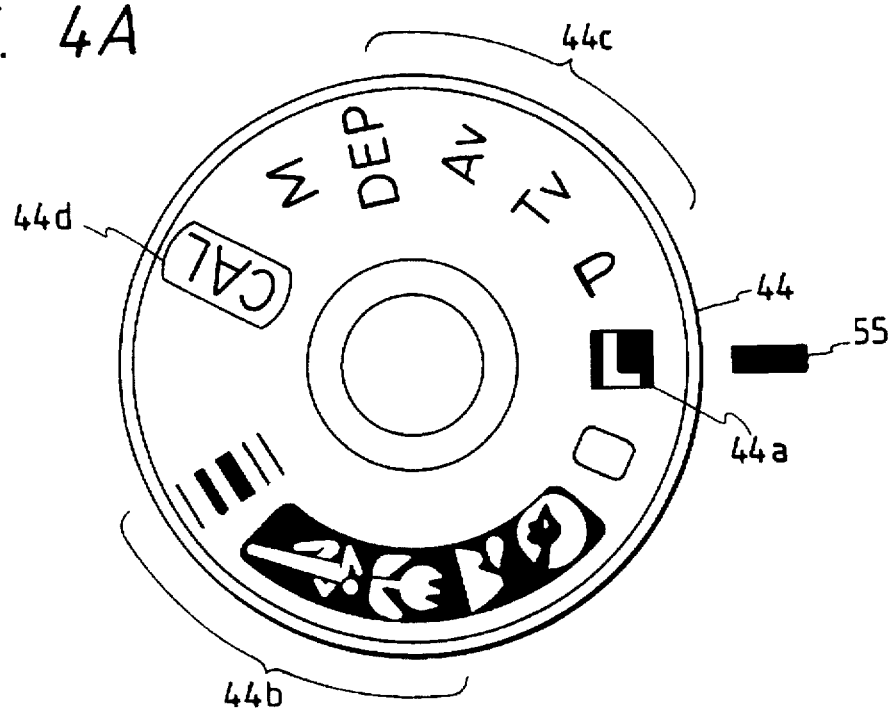
FIGS. 4A and 4B are detailed views of a mode dial shown in FIGS. 2A and 2B.

FIG. 4A is a detailed view of the mode dial 44 of FIG. 2A. When the display of the mode dial 44 is set to an indicator mark 55 printed on the camera body, the photographic mode is set based on the displayed contents. Reference numeral 44a denotes a lock position at which the camera is made inoperable; reference numeral 44b denotes an automatic photographic mode position at which the camera is controlled by a preset photographic program; reference numeral 44c denotes a manual photographic mode in which the photographer can set photographing contents, the photographic mode including the program AE, the shutter priority AE, the diaphragm priority AE, the depth of field priority AE, and manual exposure. Reference numeral 44d denotes a "CAL" position at which the visual axis is calibrated, as described later.

Figure 4B:
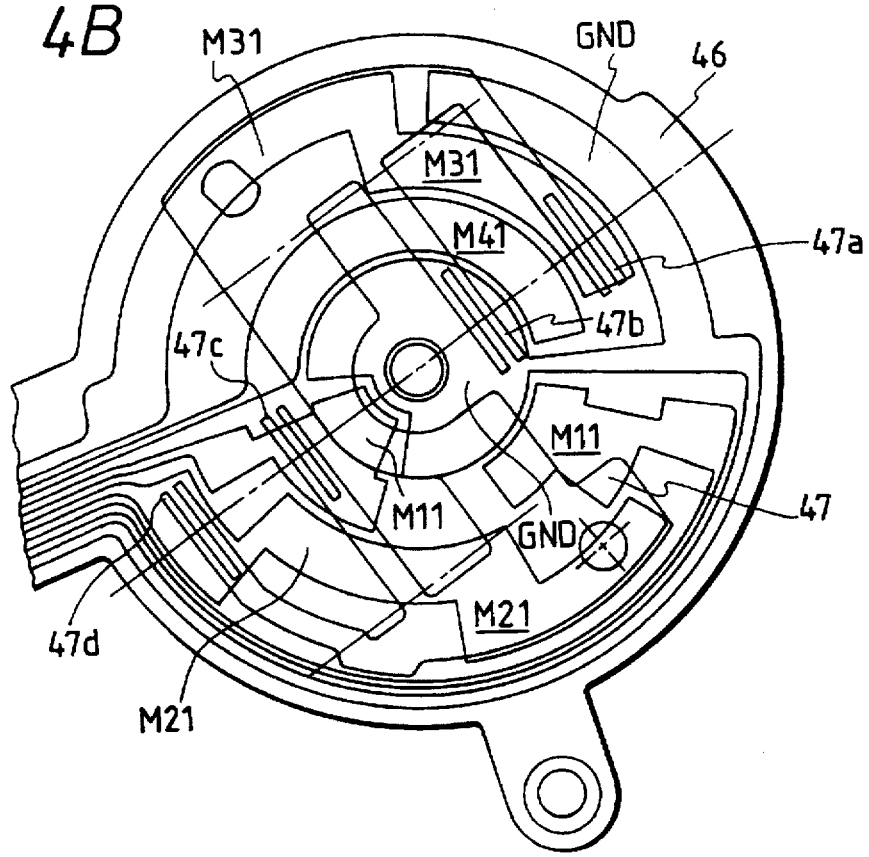

FIG. 4B is an illustration of the internal construction of the mode dial. Reference numeral 46 denotes a flexible printed board on which switch patterns (M11, M21, M31 and M41) which serve as mode dial switches and a GND pattern are arranged as shown in the figure, so that 13 positions shown in the mode dial 44 can be set in four bits by sliding four contact pieces (47a, 47b, 47c and 47d) of a switch contact piece 47 which is interlinked to the rotation of the mode dial 44.

In FIG. 2A, reference numeral 45 denotes an electronic dial for selecting a set value which is selectable further in the mode selected by the mode dial by rotating to generate a click pulse. When, for example, a shutter priority photographic mode is selected by the mode dial 44, the currently set shutter speed is displayed on the LCD 24 in the finder and the monitoring LCD 42. When the photographer rotates the electronic dial 45, the shutter speed varies in sequence from the currently set shutter speed in accordance with the direction of the rotation of the electronic dial 45.

Figure 5A:
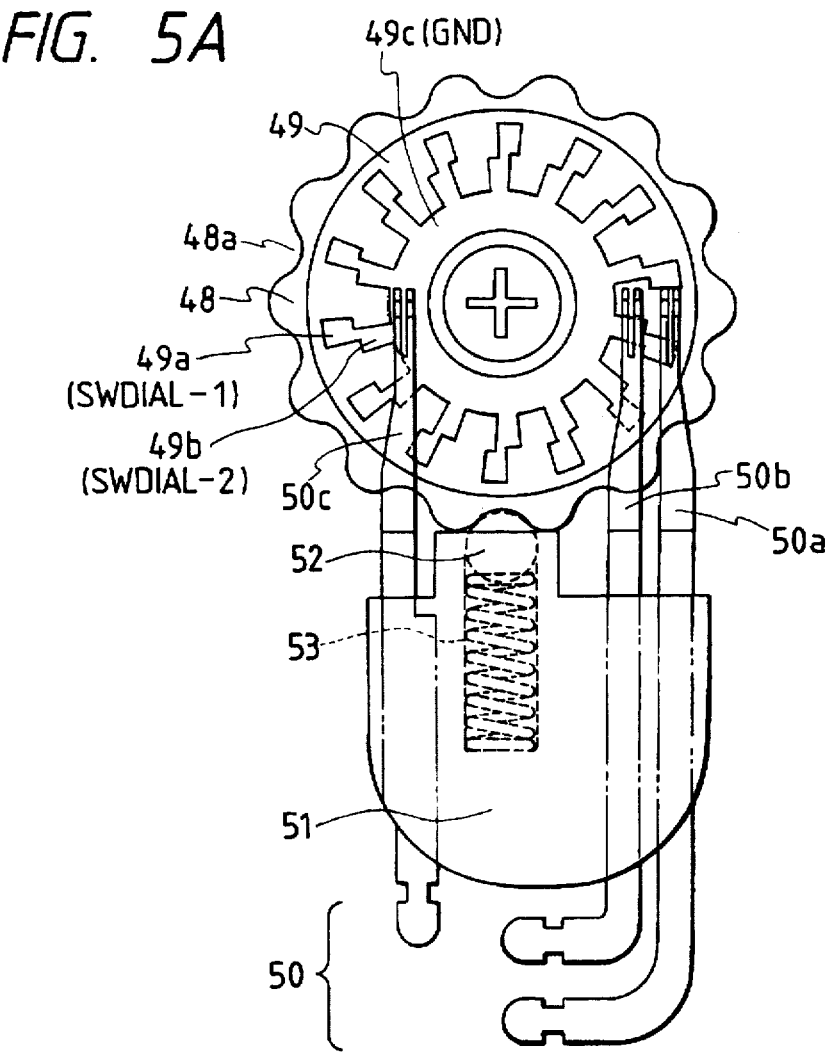
FIGS. 5A and 5B are detailed views of an electronic dial shown in FIGS. 2A and 2B.
Figure 5B:
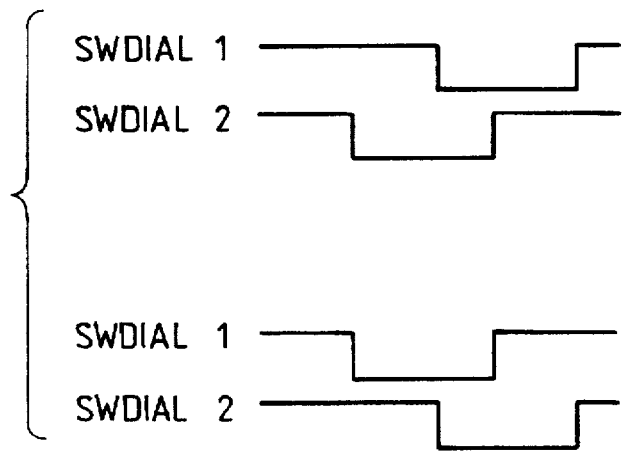

FIGS. 5A and 5B are detailed views illustrating the internal construction of the electronic dial 45. A click screen 48 which rotates together with the electronic dial 45 is disposed, a printed board 49 being fixed to this click screen. Switch patterns 49a (SWDIAL-1) and 49b (SWDIAL-2), and a GND pattern 49c are arranged on the printed board 49 as shown in the figure, and a switch contact piece 50 having three sliding contact pieces 50a, 50b and 50c is fixed to a fixation member 51.

A click ball 52 which fits into a recessed portion 48a formed around the outer periphery of the click screen 48 is disposed, and a coil spring 53 for biasing this ball is held by the fixation member 51. The sliding contact pieces 50a and 50b do not contact the switch pattern 49a or 49b at the normal position (in a condition in which the click ball 52 is fitted into the recessed portion 48a).

In the electronic dial 45 formed in this way, when the photographer rotates the dial in a clockwise direction as shown in FIGS. 5A and 5B, the sliding contact piece 50b contacts the switch pattern 49b first, and then the sliding contact piece 50a contacts the switch pattern 49a. The set value is counted up at this timing. In the case of a counterclockwise rotation of the dial, the relationship between the selecting contact point and switch pattern is exactly the reverse of this, and at this time the set value is counted down at a similar timing.

FIG. 5B is a timing chart illustrating this circumstance, in which pulse signals generated in the switch patterns 49a and 49b when the dial is rotated, and the timing thereof are shown. The upper portion of FIG. 5B illustrates a case in which the dial is rotated one click, and the lower portion thereof illustrates a case in which the dial is rotated in a counterclockwise direction. In this way, the timing of counting up/down and the direction of rotation are detected.

Figure 6:
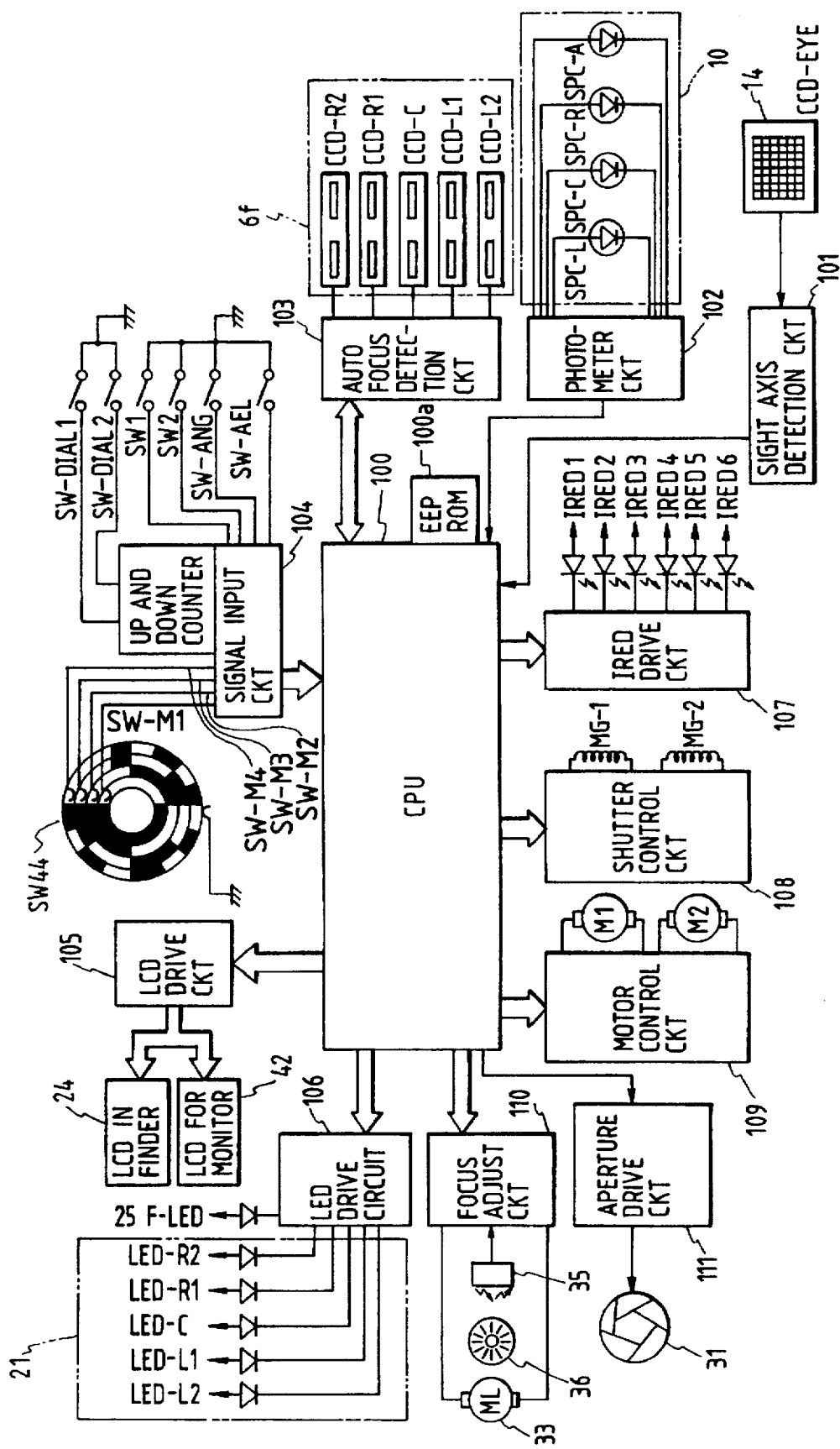
FIG. 6 is a block diagram of the essential portion of an electrical circuitry in accordance with the embodiment of the present invention.

FIG. 6 is a block diagram illustrating the essential portion of the electrical circuitry contained in the camera of the present invention. Components in FIGS. 5A and 5B which are the same as those in FIG. 1 are given the same reference numerals.

Connected to a central processing apparatus (hereinafter referred to as a CPU) 100 of a microcomputer contained in the camera body are: a visual-axis detecting circuit 101; a photometering circuit 102; an automatic focal-point detecting circuit 103; a signal input circuit 104; an LCD drive circuit 105; an LED drive circuit 106; an IRED drive circuit 107; a shutter control circuit 108; and a monitor control circuit 109. Signals are transmitted from the CPU via a mount contact point 37 shown in FIG. 1 to a focusing circuit 110 and a diaphragm drive circuit 111, both of which are arranged within the photographic lens.

The CPU 100 has an unillustrated RAM contained therein, and stores calibration data on the visual axis in the RAM. When the "CAL" position of the mode dial 44 is set to the indicator mark, a calibration mode in which visual-axis correction data (hereinafter referred to as calibration data) for correcting individual differences on the visual axis are gathered is made selectable. This makes possible setting each calibration data, turning off the calibration operation, and a visual-axis detection inhibition mode by using the electronic dial 45.

The visual-axis detecting circuit 101 converts an output of the eye ball image from the image sensor 14 (CCD-EYE) from an analog to digital form and transmits this image information to the CPU. The CPU 100 extracts each feature point of the eye ball image required for detecting the visual axis by using a predetermined algorithm as described later, and computes the visual axis of the photographer on the basis of the position of each feature point. The CPU 100, the visual-axis detecting circuit 101, and the image sensor 14 constitute an element of the visual-axis detecting apparatus.

The photometering circuit 102 amplifies the output from the photometering sensor 10, and then logarithmically compresses the output and converts it from an analog to digital form. The output is sent to the CPU 100 as brightness information for each sensor. The photometering sensor 10 is formed of four photodiodes: an SPC-L for photometering a left area 210 including left-side focus points 200 and 201 within the finder image plane shown in FIG. 3, an SPC-C for photometering a central area 211 including a central focus point 202, an SPC-R for photometering a right area 212 including right-side focus points 203 and 204, and an SPC-A for photometering an area 213 in the vicinity of these points.

The line sensor 6f is a well-known CCD line sensor formed of five line sensors, CCD-L2, CCD-L1, CCD-C, CCD-R1, and CCD-R2 corresponding to five focus points 200 to 204 within the image plane. The focal-point detecting circuit 103 converts a voltage obtained by the line sensor 6f from analog to digital form and sends it to the CPU.

SW-1 is a photometric switch which is turned on at the first stroke of the release button 41 and causes the photometering, AF, visual-axis detection operations to begin; SW-2 is a photometric switch which is turned on at the second stroke of the release button 41; SW-ANG is a posture detecting switch, such posture being detected by the mercury switch 27; SW-AEL is an AE lock switch which is turned on by depressing the AE lock button 43; SW-DIAL1 and SW-DIAL2 are dial switches (which have already been explained) disposed within an electronic dial, an output therefrom is input to an up/down counter of the signal input circuit 104 where the rotational click amount of the electronic dial 45 is counted; and SW-M1 to SW-M4 are dial switches disposed within the mode dial (which has already been explained).

Signals from these switches are input to the signal input circuit 104 and transmitted to the CPU 100 through a data bus. Reference numeral 105 denotes a well-known LCD drive circuit for driving a liquid-crystal display element LCD, making both the monitoring LCD 42 and the LCD 24 in the finder simultaneously display a diaphragm value, shutter time, a set photographic mode or the like.

The LED drive circuit 106 controls the lighting-up and blinking of the illuminating LED (F-LED) 22 and the superimposing-purpose LED 21. The IRED drive circuit 107 causes infrared-ray emitting diodes (IRED 1 to 6) to selectively light up depending upon the circumstance. The shutter control circuit 108, when an electric current is supplied thereto, controls a magnet MG-1 for making an anterior shutter blind run and a magnet MG-2 for making a posterior shutter blind run in order to expose a photosensitive member with a predetermined light amount.

The monitor control circuit 109 controls a motor M1 for taking up or rewinding a film, and a motor M2 for charging the main mirror 2 and the shutter 4. A series of release sequences is operated by the shutter control circuit 108 and the monitor control circuit 109.

Figure 7A:
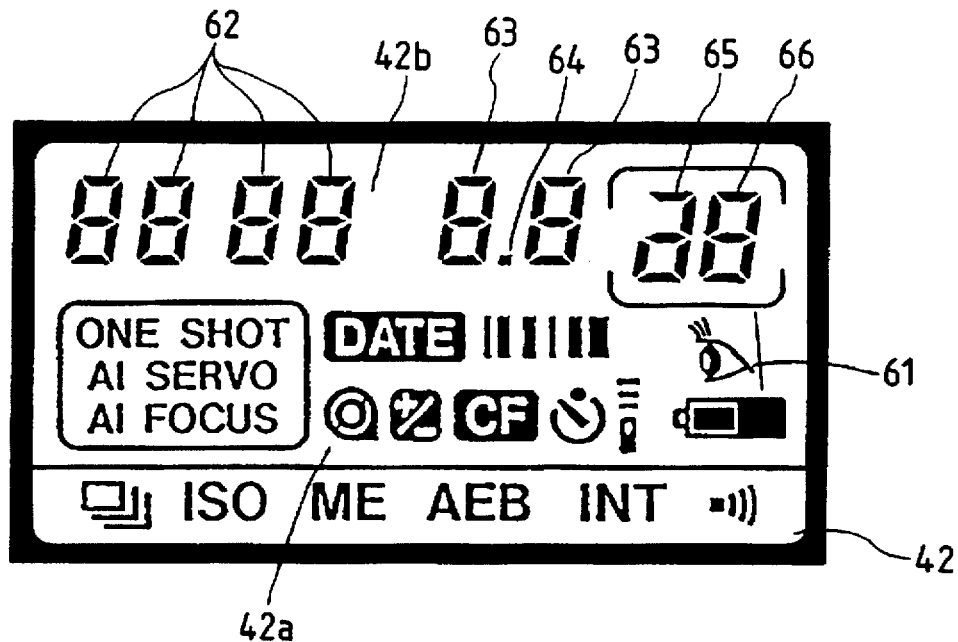
FIGS. 7A and 7B are illustrations of a portion of FIGS. 2A and 2B.
Figure 7B:
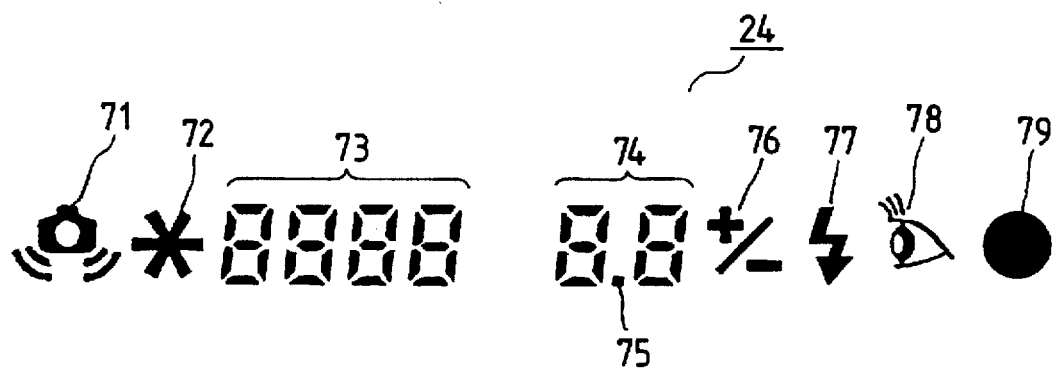

FIGS. 7A and 7B are illustrations of the contents of the segments of the monitoring LCD 42 and the LCD 24 in the finder when the contents are displayed entirely. In FIG. 7A, a visual-axis input mode display 61 for indicating that the camera AF operation performed by detecting the visual axis and the photographing operation, such as selecting a photographic mode, is controlled by using visual-axis information, in addition to a well-known photographic mode display, is provided in the fixed segment display section 42a.

The seven-segment display section 42b for displaying variable numerical values is formed of four digits of seven segments 62; two digits of seven segments 63, a decimal point 64, a limit value display segment 65 for displaying the number of frames of films, and one digit of seven segments 66.

In FIG. 7B, reference numeral 71 denotes a camera-shake warning mark; reference numeral 72 denotes an AE lock mark; reference numerals 73, 74 and 75 denote display segments which are the same as the shutter time display and the diaphragm value display; reference numeral 76 denotes an exposure correction setting mark; reference numeral 77 denotes a strobe charge-completed mark; reference numeral 78 denotes a visual-axis input mark for indicating that a visual axis is input; and reference numeral 79 denotes an in-focus mark for indicating an in-focus state of the photographic lens 1.

A description will now be given of the operation of a camera having the visual-axis detecting device, with specific reference to FIG. 8 which is a flow chart illustrative of the camera operation and also to FIGS. 16A, 16B, 17A and 17B which show the states of displays in the finder.

The camera is set from inoperative state to a preselected photographing mode by rotation of the mode dial 44, so that the power supply of the camera is turned on (Step S100). The description proceeds on an assumption that the preselected photographing mode to which the camera is set is shutter-speed priority AE photographing mode.

The camera is then held in stand-by state until a switch SW1 is turned on by depression of the release button (S102). When the release button 41 is pressed, the switch SW1 is turned. When the turning on of the switch SW1 is detected by the signal input circuit 104, the CPU 100 inquires the visual-axis detecting circuit 101 whether the detection of visual axis has been disallowed (S103).

If visual-axis detection has been disallowed, the visual axis detecting operation is not executed, a focus point is selected by an automatic focus point selection routine (S116) without using visual-axis information, and detection of focal point is conducted by the automatic focal point detecting circuit 103 on the basis of the selected focus point (S107). In this case, the LCD drive circuit 105 operates to turn off the visual-axis input mark 78 formed by the LCD 24 in the viewfinder, so that the photographer can confirm that the camera does not perform visual-axis detection by a sign put on an extra-frame region 207 in the viewfinder (see FIG. 17A).

Figure 10:
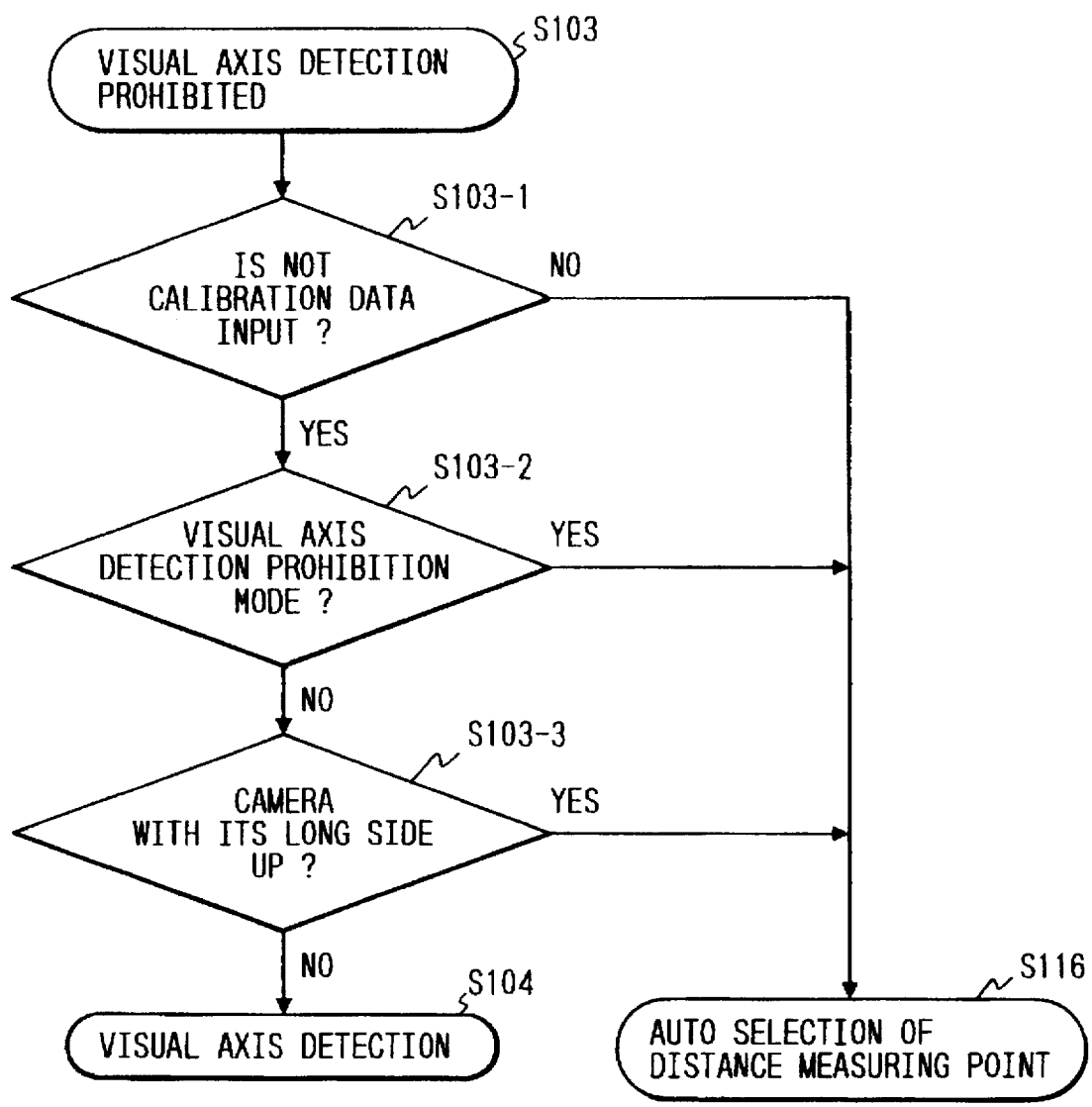
FIG. 10 is a flowchart showing the visual-axis detection inhibition.

Conditions which disallow the visual-axis detection are illustrated in FIG. 10 and will be described later. Among various conceivable algorithms of automatic focus point selection, proximal-point priority algorithm which gives the greatest weight to the central focus point, is used effectively. An example of such algorithm is shown in FIG. 9, and will be explained later in detail.

If the visual-axis detection has not been disallowed, the visual-axis detecting circuit 101 executes the visual-axis detection (S104). In this state, the LED driving circuit 106 drives the illuminating LED (F-LED) 25 to turn it on, while the LCD driving circuit 105 drives the LCD 24 in the viewfinder to turn on the visual-axis input mark 78, so that the photographer can confirm that the camera is in a mode to perform visual-axis detection, through a display on the extra-frame region 207 in the viewfinder (see FIG. 16A).

The 7-segment display 73 indicates the shutter speed value. In the description of this embodiment, it is assumed that camera has been set to shutter-speed priority AE mode and the shutter speed has been intentionally set to 1/250 second, so that the value 250 is displayed by the 7-segment display. The visual axis detected by the visual-axis detecting circuit is converted into values on the observed point coordinate on the focusing plate 7. The CPU 100 then selects the focus point which is close to the coordinate values of the observed point coordinate, and transmits a signal to the display circuit 106 so as to flicker the focus-point mark by using the superimpose LED 21 (S105).

Figure 16A:
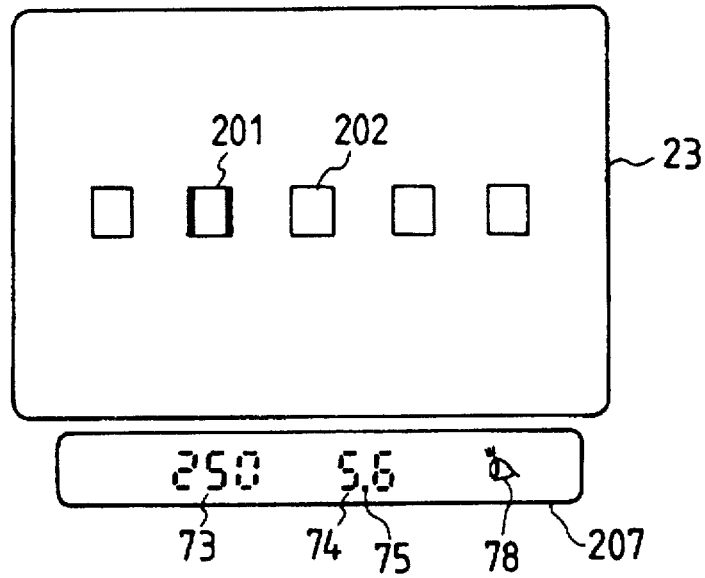
FIGS. 16A and 16B are illustrations of a display within the field of view of the finder of FIG. 1.

FIG. 16A illustrates that the focus-point mark 201 has been selected. When the credibility of observed point is low, the photographer may find that the focus point selected based upon his visual axis and displayed is incorrect. In such a case, the photographer relieves the release button 41 to turn the switch SW1 off (S106), so that the camera is kept in stand-by state until the switch SW1 is turned on again. However, if the photographer goes on to keep the switch SW1 in on state upon recognition of the focus point selected by the visual axis and displayed in the viewfinder (S106), the camera performs focal point detecting operation on at least one focus point (S107). The camera determines whether the focusing is incapable on the selected focus point (S108). If the focusing is incapable, the CPU 100 sends a signal to the LCD driving circuit 105 to flicker the in-focus mark of the LCD 24 in the viewfinder, thereby informing the photographer of the incapability of focusing (S118), until the photographer turns the switch SW1 off by freeing the button 41 (S119).

Figure 16B:
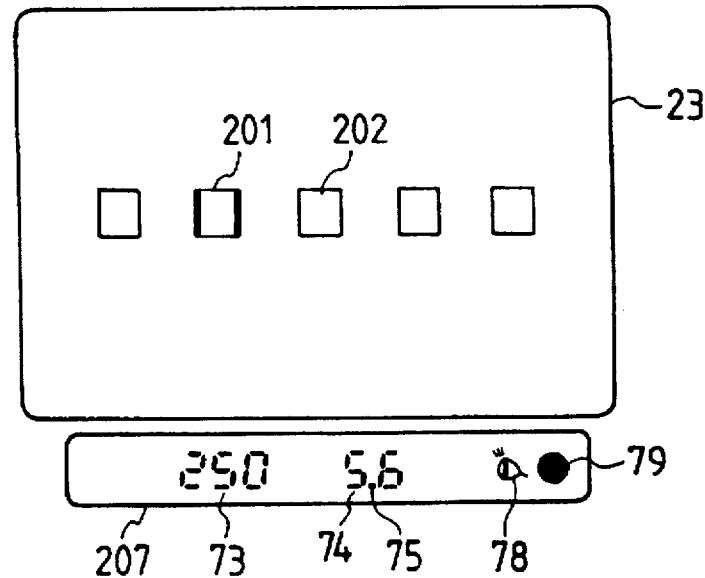

If focusing is not incapable and if the focusing state on the focus point selected by the algorithm is not in-focus (S109), the CPU 100 sends a signal to the lens focusing circuit 110 so as to drive the photographing lens 1 by a predetermined amount (S117). After the driving of the lens, the automatic focal point detecting circuit 103 performs the focal point detecting operation again (S107), thereby determining whether the photographing lens 1 has been in in-focus state or not (S109). If the photographing lens 1 has been in in-focus state on the preselected focus point, the CPU 100 transmits a signal to the LCD driving circuit 105, thereby flickering the in-focus mark 79 formed by the LCD 24 inside the viewfinder, while sending a signal also to the LED driving circuit 106 to enable in-focus indication on the focus point 201 on which the lens is focused (S110) (FIG. 16B).

In this state, the flickering of the focus point selected based upon the visual axis is terminated. In most cases, however, the focus point on which the in-focus state is indicated coincides with the focus point selected based upon the visual axis. Therefore, in order to inform that the in-focus state has been achieved, the focus point on which the in-focus state has been achieved is lighted up. If the photographer finds that the focus point displayed as being in in-focus state in the viewfinder is incorrect, the photographer relieves the release button 41 so as to turn the switch SW1 off (S111), so that the camera is held in stand-by condition until the switch SW1 is again turned on.

Conversely, if the photographer goes on to keep the switch SW1 in on state (S111), the CPU 100 operates to send a signal to the photometering circuit 102 to cause the latter to perform photometering operation (S112). Consequently, exposure value is computed with suitable weighting on the photometric regions 210 to 213 containing the focus point on which the in-focus state has been achieved.

In the illustrated embodiment, photometric computation is executed in accordance with a known method by giving weight to the photometric region 210 containing the focus point 201. Consequently, the 7-segment display 74 and the decimal point display 75 are activated to display the aperture value (F 5.6). (FIGS. 16A, 16B, 17A and 17B).

Then, a determination is done as to whether the release button 41 has been pressed to turn the switch SW2 on (S113). If the switch SW2 is still off, the state of the switch SW1 is confirmed again (S111). Conversely, if the switch SW2 has been turned on, the CPU 100 sends signals to the shutter control circuit 108, motor control circuit 109 and the aperture driving circuit 111.

First of all, electrical power is supplied to MG2 to turn the main mirror 2 up. Then, after the aperture 31 is stopped down, MG1 is energized to open the front curtain of the shutter 4. The aperture value of the aperture 31 and the shutter speed of the shutter 4 are determined based upon the exposure value detected by the photometering circuit 102 and the sensitivity of the film 5. After elapse of the set shutter time (1/250 sec), MG2 is energized to close the rear curtain of the shutter 4. Exposure of the film 5 is thus completed. Then, MG2 is energized again to turn the mirror down and to charge the shutter. At the same time, MG1 is energized to perform one-frame feed of the film, whereby a series of shutter release sequence is completed (S114). The camera is then kept in stand-by state until the switch SW1 is turned on again.

Figure 8B:
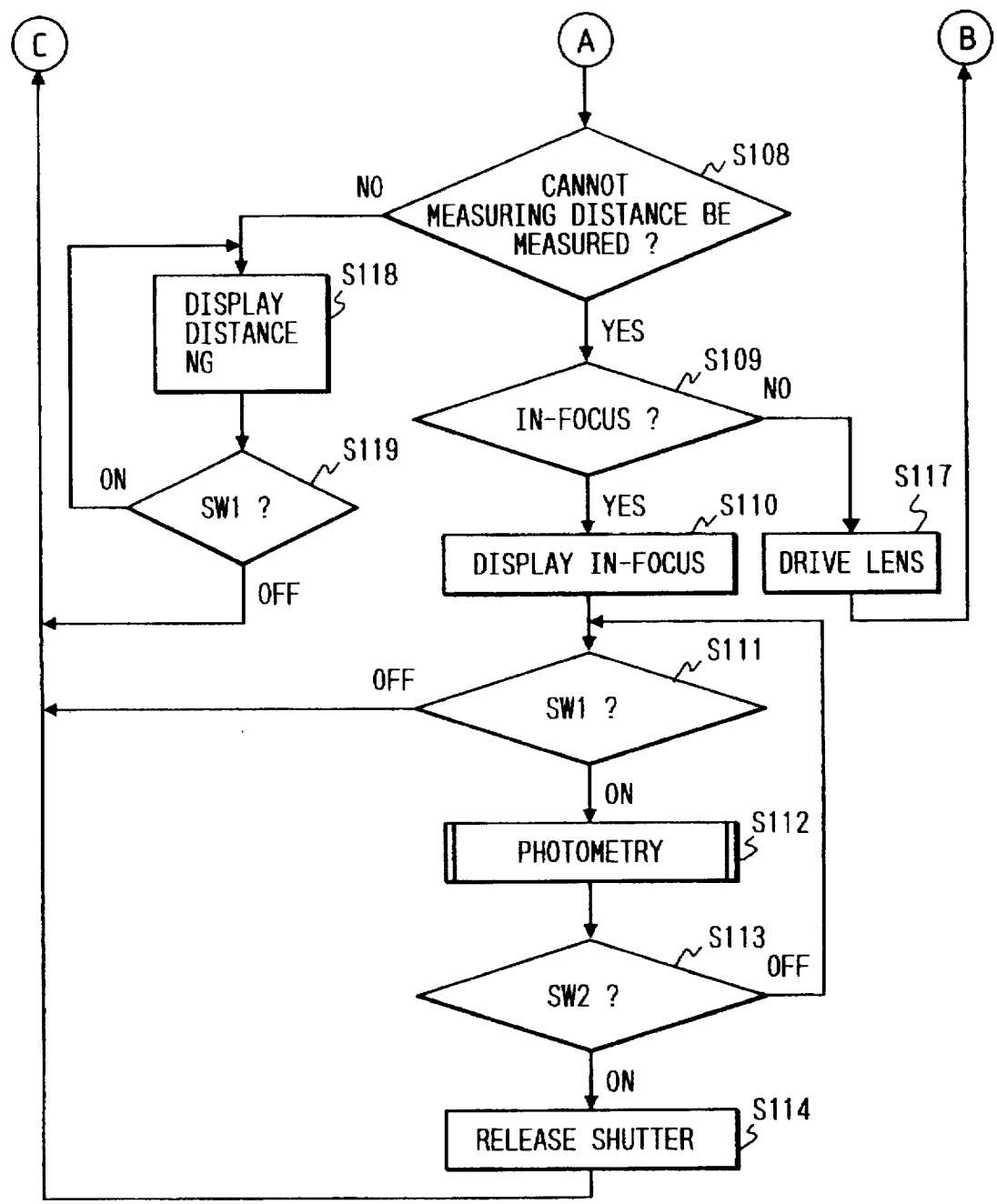
FIG. 8 is comprised of FIGS. 8A and 8B showing flowcharts of the operation of the single-lens reflex camera of FIG. 6.

Changing of mode by the mode dial 44 to visual-axis calibration mode, in a step other than the step of shutter releasing (S114) in the flow shown in FIGS. 8A and 8B, is detected by the signal input circuit 104. In such a case, the CPU operates to suspend the operation of the camera, and transmits a signal to the visual-axis detecting circuit 101 to set it to a state which enables calibration of the visual axis (S115). The method of calibration of the visual axis will be described later in detail.

A description will now be given of the automatic focus point selecting sub-routine S116, with specific reference to FIG. 9. As stated before, this sub-routine is executed when the calibration data has not been entered yet or when visual-axis detection is disallowed, i.e., when the camera has not been set to visual-axis input mode, as well as when the camera has been turned sideways, in order to determine the focus point on the basis of information concerning the amounts of defocus of the focus points and absolute distance.

Whether or not any focusable point exists among the five focus points is determined (S501). If none of these focus points is focusable, the process returns to the main routine (S511). If there is one focusable point (S502), this point is set to be the focus point (S507). If there are two or more focusable points, the process proceeds to next step which determined whether the central focus point is included in these focusable focus points (S503) and then further to the next step (S504) which determines whether the central focus point is within a predetermined small distance, e.g., a distance which is not more than 20 times the focal distance.

If the central measuring point is at a short distance and focusable, or if the central focus point is not focusable, the process proceeds to Step S505 which determines that the main subject is considerably close to the photographer on condition that the number of the short-distance focus points exceeds the number of the long-distance focus points. The focus point of the shortest distance is then selected (S506). If the number of the short-distance focus points is fewer, it is determined that the main subject is rather far from the photographer, and the closest one of the long-distance focus points is selected taking into account the field depth (S510). If the central focus point is determined to be at a long distance in Step S504, the process proceeds to Step S508.

If the number of the long-distance focus points exceeds the number of the short-distance focus points, it is determined that the main subject is in the long-distance side including the central focus point, so that the central focus point is selected (S509). If the number of the long-distance focus points is smaller than that of the short-distance focus points, the closest point is determined as the focus point (S506) as stated before.

Figure 17A:
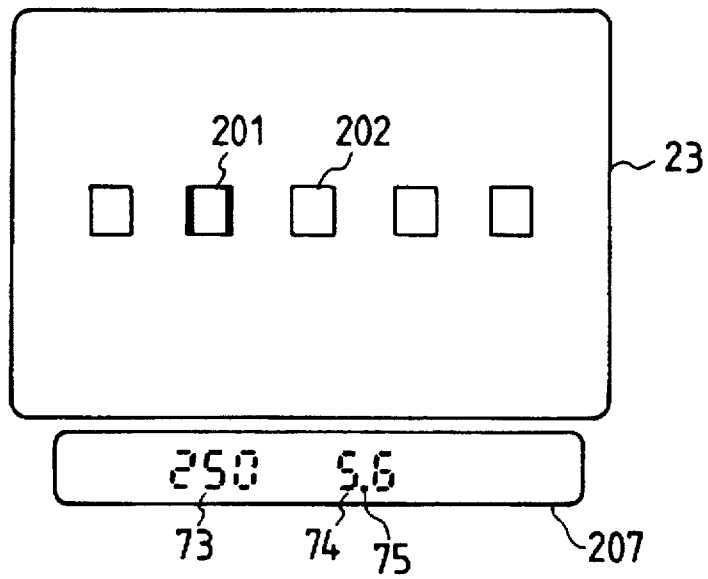
FIGS. 17A to 17D are illustrations of a display within the field of view of the finder of FIG. 1.
Figure 17B:
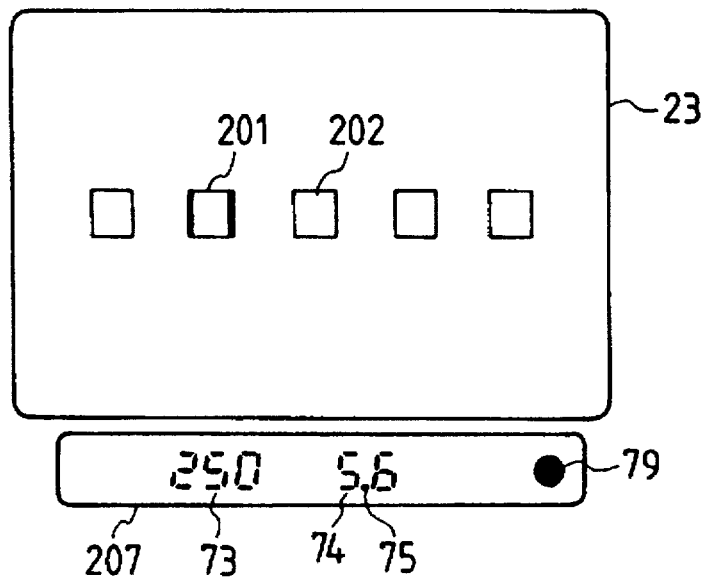
Figure 17C:
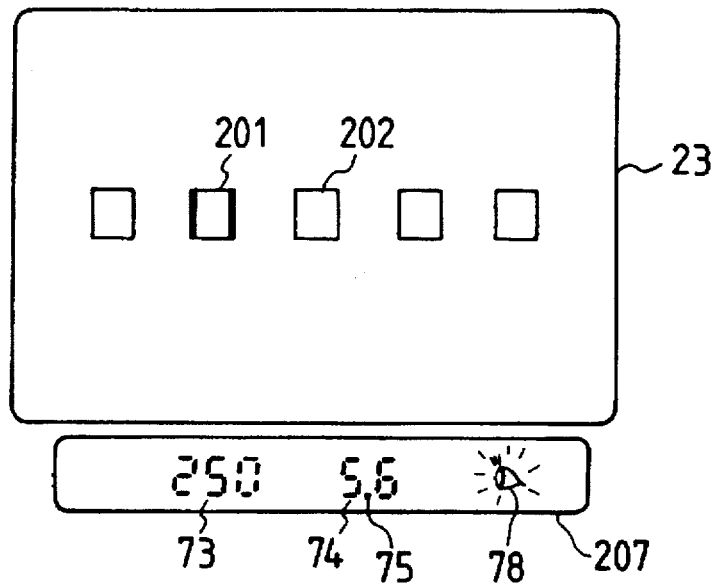

Thus, if there is one or more focusable focus points, one of such points is automatically selected and the process returns to the main routine (S511), so that the focal point detection is executed again on this focus point (S107). In this case also, when in-focus state is established, the focus point 201 and the in-focus mark 79 are lit on as shown in FIG. 17B as is the case of FIG. 16B which shows the in-focus state obtained on the basis of the visual-axis information. In this case, needless to say, the visual-axis input mark 78 is not lit on.

FIG. 10 shows a flow chart showing the process for determining whether the detection of visual axis is possible or not. Prior to the detection of the visual axis, the visual-axis detecting circuit 101 determines whether or not the detection of visual axis is possible. As the first step, whether or not the calibration data has been input to the camera has been entered (S103-1). If the calibration data has not been input yet, the process proceeds to automatic focus point selection sub-routine without executing the detection of visual axis (S116).

If the calibration data has been input, whether or not the camera has been set to the visual-axis detection inhibition mode (S103-2). If the camera has been set to this mode, the process proceeds to the automatic focus point selection sub-routine. If not, the posture of the camera, i.e., whether the camera has been held in vertical or horizontal position, is sensed through the signal input circuit 104. More specifically, the signal input circuit 104 determines whether the camera is in horizontal or vertical posture, based on the output signal from a mercury switch (SW-ANG) (S103-3). If the camera has been set in vertical posture, the visual-axis input mark 78 of formed by the LCD 24 in the viewfinder is turned off as shown in FIG. 17A. Upon confirming that the camera is not held in vertical posture, the visual-axis input mark 78 formed by the LCD 24 in the viewfinder is lit on as shown in FIG. 16A so as to inform that the detection of visual axis is possible. The process then advances to the visual-axis detecting sub-routine.

Figure 11:
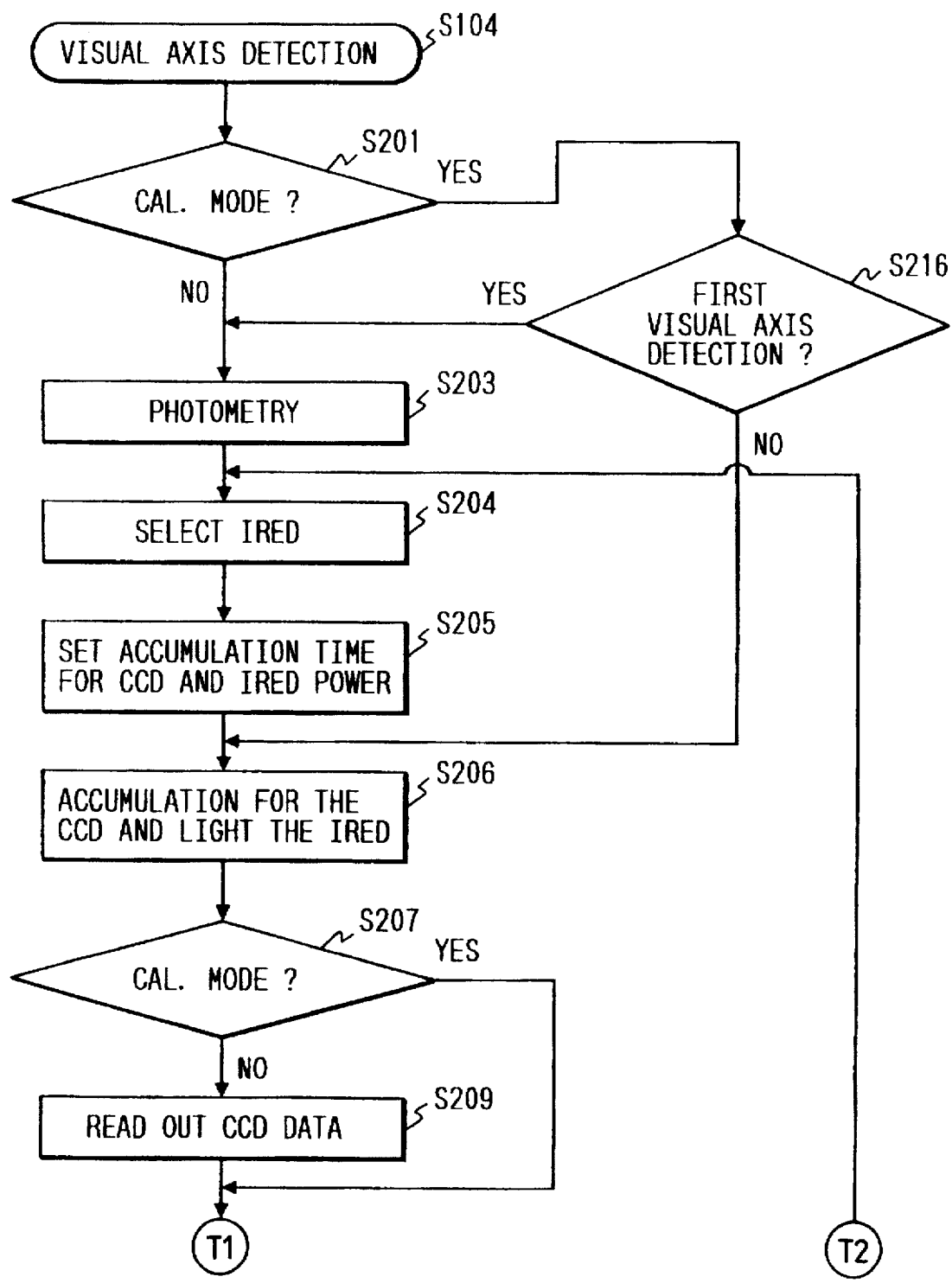
FIG. 11 is a flowchart showing the visual-axis detection.
Figure 12:
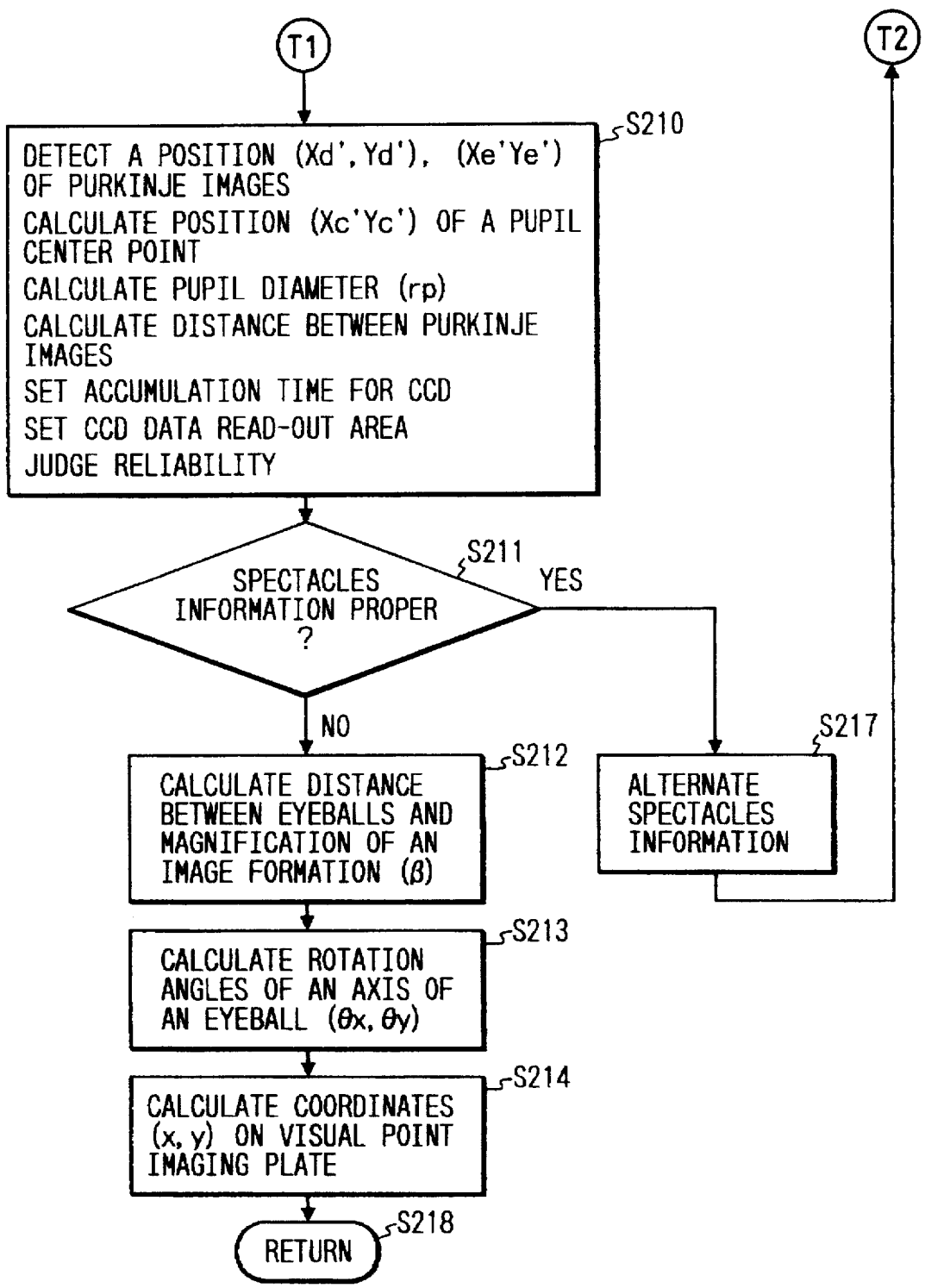
FIG. 12 is a flowchart showing the visual-axis detection.

FIGS. 11 and 12 are flow charts illustrative of the process for detecting the visual axis. As stated before, the visual-axis detecting circuit 101 executes the detection of visual-axis upon receipt of a signal from the CPU 100 (S104). The visual-axis detecting circuit 101 determines whether the visual-axis detecting operation is to be performed in photographing mode or in visual-axis calibration mode (S201). Subsequently, information concerning the brightness of the photographing field is obtained from the photometering circuit 102 through the COU 100 (S203).

Then, selection of infrared light emitting diodes (referred to as "IRED" hereinafter) is conducted among IREDs 13a to 13d, based on the information concerning the camera posture and the eyeglass information which is concerned with the eyeglass worn by the photographer and which is contained in the calibration data (S204). Namely, if the camera is held in horizontal posture while the photographer does not wear eyeglass, IREDs 13a, 13b near the finder optical axis are selected as shown in FIG. 2A. When the photographer wears eyeglass while the camera is held in horizontal posture, IREDs 13c, 13d remoter from the finder optical axis are selected.

The arrangement is such that part of the illuminating light reflected by the photographer's eyeglass is directed to the outside of a predetermined region on the image sensor 14 on which the image of the eye ball is projected, so as not to cause impediment to the analysis of the eye ball image. More specifically, the direction of the illuminating light to the eye ball is changed in accordance with the eyeglass information so as to prevent the noise light reflected by the eyeglass from coming into the image sensor, thus offering detection of visual axis at high degree of accuracy.

Subsequently, the accumulation time of the image sensor 14 (referred to as "CCD-EYE" hereinafter), as well as the illuminating power of IREDs, is set based upon the photometric information, eyeglass information and so forth (S205). The accumulation time of CCD-EYE and the illuminating power of IREDs may be set on the basis of a value determined in accordance with, for example, the contrast of the eye ball image obtained in the preceding visual-axis detecting operation.

After the setting of the accumulation time of the CCD-EYE and the illuminating power of the IREDs, the CPU 100 activates the IRED driving circuit 107 to light up the IREDs with a predetermined level of power. At the same time, the visual axis detecting circuit 101 commences the accumulation (S206). The CCD-EYE terminates the accumulation when the set accumulation time of the CCD-EYE expires. At the same time, the IREDs are turned off.

The image output read from the CCD-EYE is stored in the CPU 100 after A/D conversion performed in the visual-axis detecting circuit 101. With this data, the CPU 100 performs computation for extracting the characteristic points of the eye ball image (S210). More specifically, the CPU 100 detects the positions (d', yd'), (e', ye') of the Purkinje images which are virtual images of the pair of IREDs used for illuminating the eye ball. In this case, the Purkinje image appears as a bright spot having high intensity of light. Therefore, Purkinje image can be detected as a bright spot having a light intensity which exceeds a threshold level suitably determined in regard to the light intensity.

The position (c', yc') of the pupil center is computed by approximating a circle by least square approximation technique on the basis of a plurality of border points detected on the border between the pupil 19 and the iris 17. The radius $r_p$ of the pupil also is computed. Furthermore, spacing between the Purkinje images is computed based on the positions of these images.

While analyzing the eye ball image, the CPU detects the contrast of the eye ball image and readjust the CCD-EYE accumulation time in accordance with the detected contrast of the eye ball image.

Credibility or reliability of positions of the Purkinje images and pupil center are determined based upon the contrast of the eye ball image or the size of the pupil. The reliability information thus obtained forms a part of the visual-axis calibration data.

After completion of the analysis of the eyeball image, the visual-axis detecting circuit 101 which serves also as means for confirming the calibration data determines whether or not the eyeglass information in the calibration data is correct, based on the combination between the computed Purkinje image spacing and the activated IREDs (S211), thus adapting the system to a photographer who sometimes wear eyeglass and sometimes do not use eyeglass.

For instance, when IREDs 13c and 13d are lit on among the IRED shown in FIG. 2A under such a condition that the eyeglass information concerning the photographer in the calibration data has been set assuming the use of the eyeglass, the system determines that the photographer is a glass wearer so that the eyeglass information is valid, on condition that the spacing between the Purkinje images is greater than a predetermined value.

Conversely, if the spacing between the Purkinje images is smaller than the predetermined value, the system determines that the photographer does not wear glass or uses a contact lens, thus concluding that the eyeglass information is invalid. If the eyeglass information is determined as being invalid (S211), the visual-axis detecting circuit 101 conducts alteration of the eyeglass information (S217) and performs again the selection of IREDs (S204), thereby triggering the visual-axis detecting operation.

Conversely, if the eyeglass information is determined as being correct and valid (S212), the distance between the ocular 11 and the photographer's pupil 15 is calculated based on the spacing between the Purkinje's image, and the imaging magnification β of the eye ball image projected on the CCD-EYE is computed based upon the compute distance between the ocular 11 and the photographer's pupil 15. Using the values obtained through the above-described computations, the angle θ of rotation of the optical axis of the eye ball 15 is represented as follows, by modifying the equation (3):

$$\theta x \approx \text{Arc Sin } [\{x_c'-(x_p'+\delta x)\}/\beta/|OC|] \quad (6)$$

$$\theta y \approx \text{Arc Sin } [\{y_c'-(y_p'+\delta y)\}/\beta/|OC|] \quad (7)$$

wherein the parameters $x_p'$ and $y_p'$ are respectively given as follows:

$$x_p' \approx (x_d'+x_e')/2$$

$$y_p' \approx (y_d'+y_e')/2$$

Correction terms for correcting the center position midst between two Purkinje images are represented by δx and δy.

With the eye ball rotation angles θx and θy determined as described, the position (x, y) of the visual axis on the focusing plate 7 is determined as follows (S214), through modification of the equation (5):

$$x \approx m \times ax \times (\theta x + bx) \quad (8)$$

$$y \approx m \times ax \times (\theta y + by) \quad (9)$$

Symbols ax, bx and cx represent parameters for compensating for variation in the visual axis for individual photographers, among which ax is the calibration data.

The parameter bx, which corresponds to the amount of correction of the visual axis in relation to the optical axis of the eye ball in the horizontal direction (x direction) is represented as follows:

$$bx = kx \times (r_p - rx) + bOx \quad (10)$$

Thus, the parameter bx is a function of the pupil radius $r_p$. In equation (10), rx is a constant, while bOx is calibration data.

Referring further to the equation (10), the proportion constant kx on the pupil radius $r_p$ takes different values according to the size of the pupil.

More specifically, kx equals to 0 (kx=0) on condition of $r_p \geq rx$, whereas, on condition of $r_p < rx$, kx is given by the following formula (11):

$$kx = \{1 - k0 \times k1 \times (\theta x + bx') / k0 \uparrow\} \times k0 \quad (11)$$

Thus, the proportion constant kx is zero when the pupil radius $r_p$ is greater than predetermined size rx, whereas, when the pupil radius $r_p$ is smaller than the predetermined size rx, kx is obtained as a function of angle ηx of rotation of the eye ball optical axis.

The parameter bx' corresponds to the amount of correction of the visual axis adopted when the photographer is gazing at a substantially central region in the viewfinder, and is expressed as follows:

$$bx' = k0 \times (r_p - rx) + bOx$$

wherein k0 represents calibration data which indicates the rate of change in the correction amount bx with respect to a change in the pupil radius $r_p$ as obtained when the photographer is gazing at the substantially central region in the viewfinder. Factor K1 is a predetermined constant.

The parameter by corresponding to the amount of correction in the vertical direction (y direction) is a function of the pupil radius $r_p$ as represented by the following equation (12).

$$by = ky \times r_p + bOy \quad (12)$$

Terms ky and bOy are calibration data. The method of determining the calibration data will be described later.

The level of the reliability of the visual-axis coordinate values computed in accordance with the equations (8) to (12) is altered in accordance with the level of reliability of the visual axis calibration data. The process returns to the main routine after determination of the coordinate values of the visual axis on the focusing plate 7.

The flows of the visual-axis detecting process shown in FIGS. 11 and 12 are valid also in the visual axis calibration mode. In Step S201, when the visual axis detection is determined as being that for the calibration mode, the process proceeds to Step S216 which determines whether the present visual-axis detection is the first one conducted in the calibration mode. When the present visual-axis detection is determined as being the first one in the calibration mode, brightness of environment is conducted (S203) for the purpose of enabling setting of the CCD-EYE accumulation time and IRED illumination power. Then, successive steps are followed in the same manner as that described before.

Conversely, if the present visual-axis detection is determined to be the second one or further conducted under the calibration mode (S216), CCD-EYE accumulation time and the IRED illumination power are set to the same levels as those obtained in the preceding visual-axis detecting operation, thus starting lighting up of the IREDs and CCD-EYE accumulation without delay (S206). Then, the content of CCD-EYE is read out when the accumulation in CCD-EYE is completed (S209). Then, steps are followed in the same manner as that described before.

In the visual-axis detection flows shown in FIGS. 11 and 12, the variables which are employed when the process returns to the main routine are the coordinates (x, y) of the visual axis on the focusing plate, when the visual-axis detection has been conducted under ordinary mode, i.e., not in the calibration mode. In case that the visual-axis detecting operation has been done under calibration mode, however, the above-mentioned variables are the angles (θx, θy) of rotation of the axis of he photographer's pupil. Other variables, i.e., the level of reliability of the detection result, CCD-EYE accumulation time and so forth are common to both these cases.

In the illustrated embodiment, photometric information obtained by means of the photometering sensor 10 of the camera is used as the basis for setting the accumulation time of the CCD-EYE 14 and the illuminating power of the IREDs 13. This, however, is not exclusive and any means disposed in the vicinity of the ocular for detecting the brightness of the forehead of the photographer may be used to provide the information to be used as the basis for the setting of the accumulation time and illuminating power.

Calibration Procedure

Figure 13:
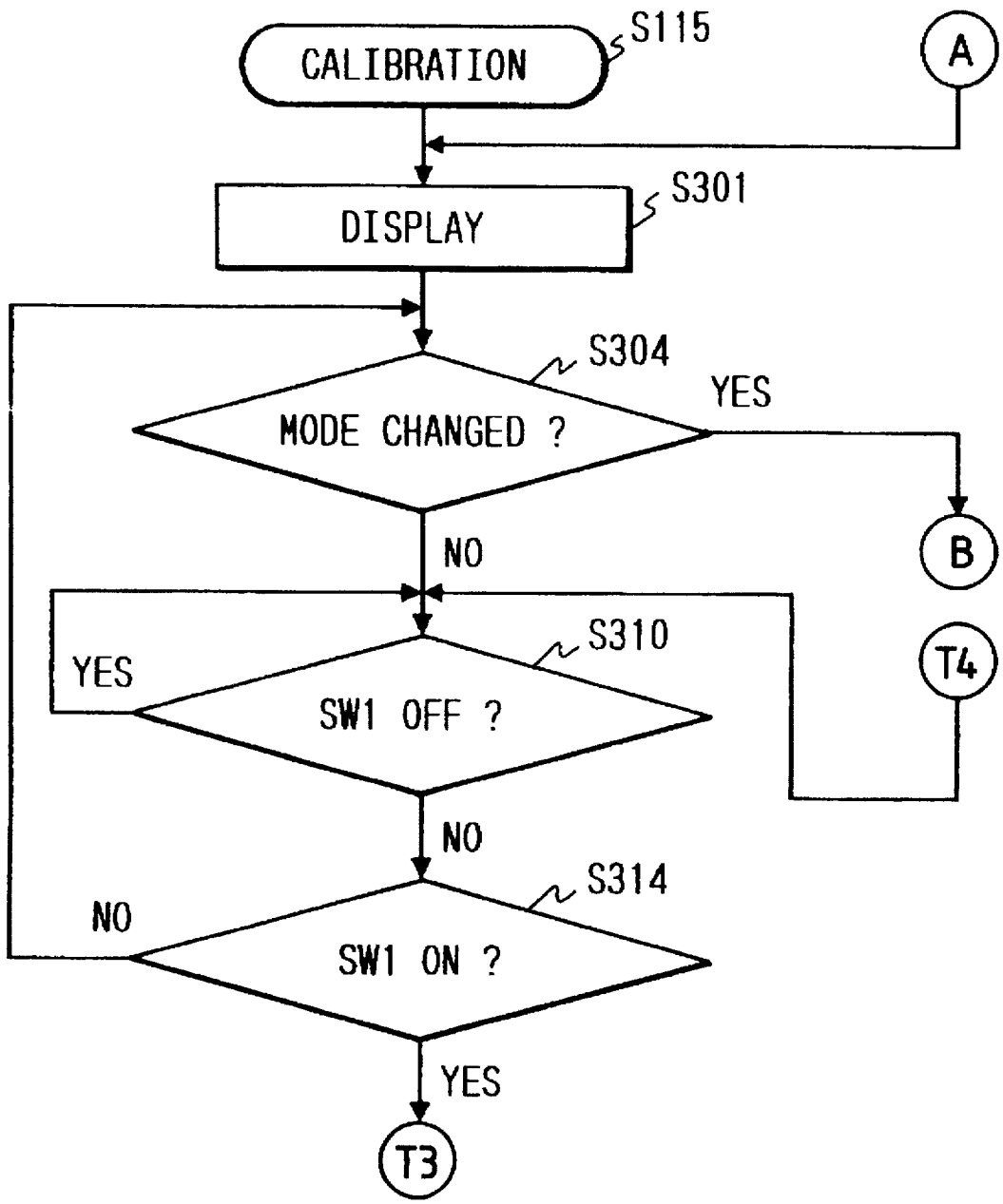
FIG. 13 is a flowchart showing calibration in accordance with the present invention.
Figure 14:
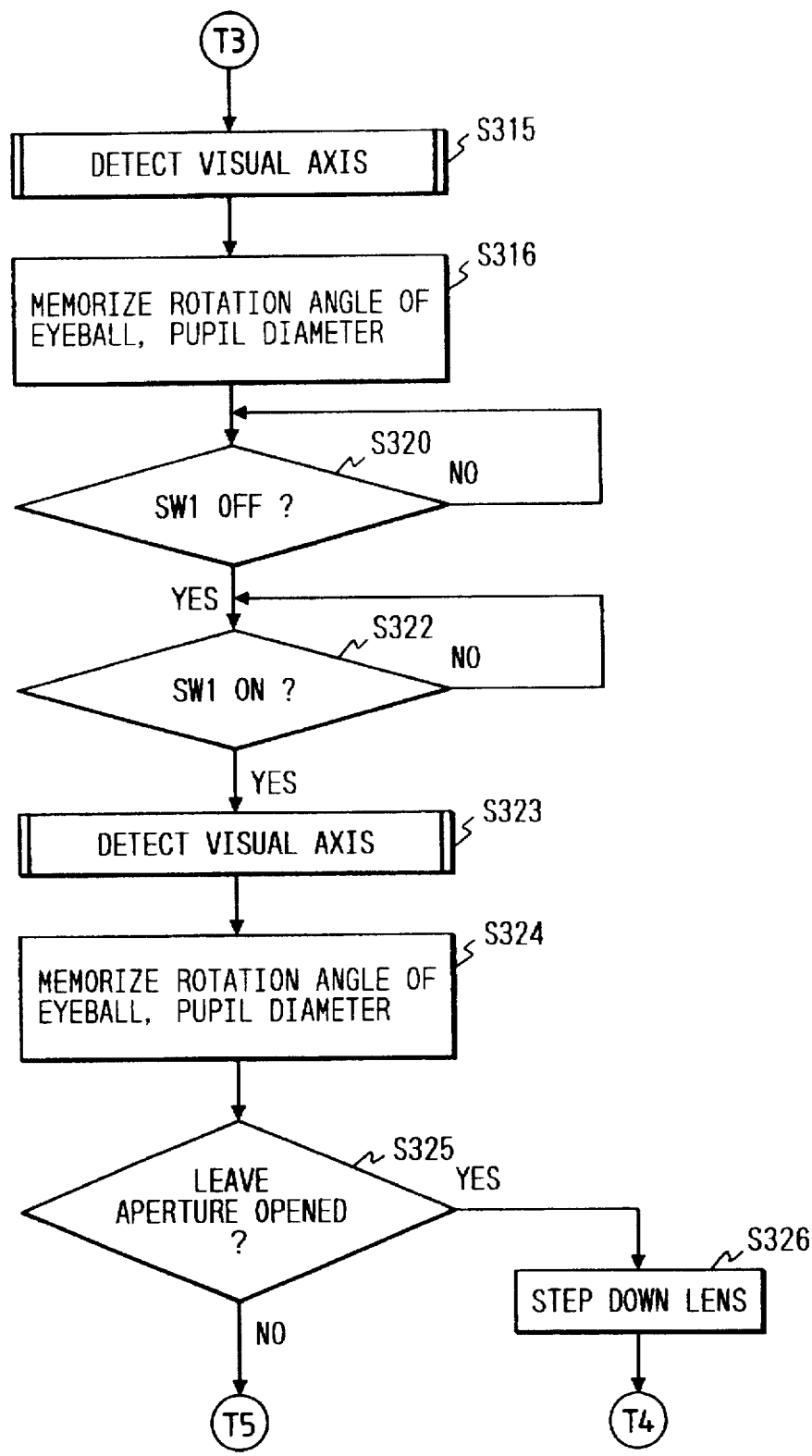
FIG. 14 is a flowchart of the calibration in accordance with the present invention.
Figure 15:
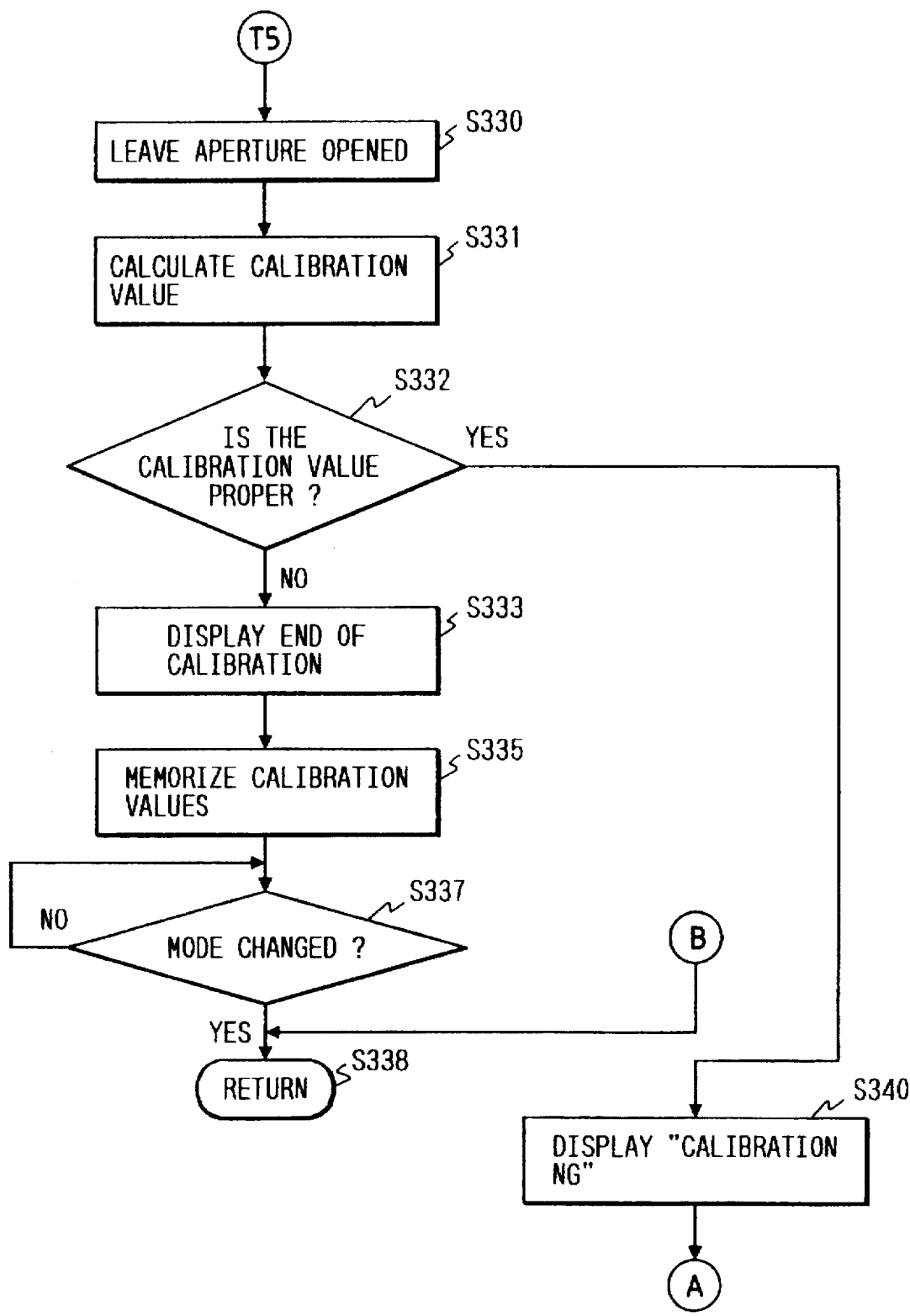
FIG. 15 is a flowchart of the calibration in accordance with the present invention.

FIGS. 13 to 15 are flow charts showing a process for effecting calibration of the visual axis, while FIGS. 18 to 20C are illustrations of the state of display performed by the monitor display LCD 42 during the calibrating operation.

Hitherto, calibration of visual-axis has been conducted by detecting the visual axes as observed when the photographer gazes at two or more visual indicator marks. In this embodiment, however, calibration of visual axis is achieved by letting the photographer gaze two indicator marks twice at different brightness levels and detecting the visual axes during such gazes, as will be understood from the following description taken in conjunction with FIGS. 13 to 15 and FIGS. 18 to 20C.

Assume here that the photographer has rotated the mode dial 44 to bring a visual indicator mark into alignment with CAL position 44d, so that the camera is set to visual-axis calibration mode. Consequently, the signal input circuit 104 sends a signal to the LCD driving circuit 105 through the CPU 100, thus enabling the monitor display LCD 42 to display that the mode has been set to one of the visual-axis calibration modes which will be described later.

Figure 20A:
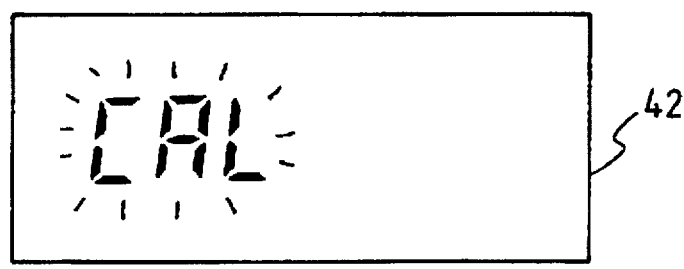
FIGS. 20A to 20C are illustrations of a display within the field of view of the finder of FIG. 1.
Figure 20B:
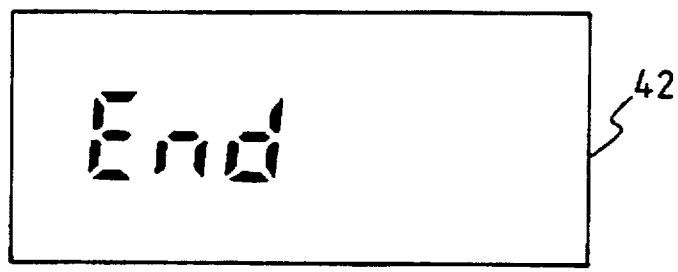
Figure 20C:
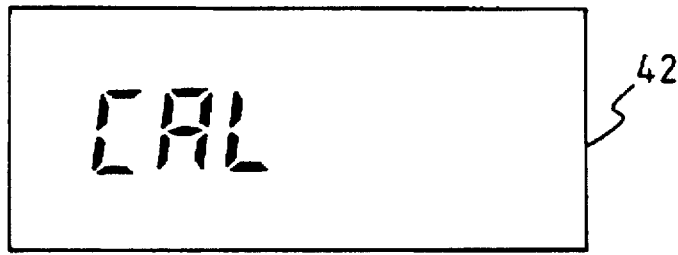
Figure 21:
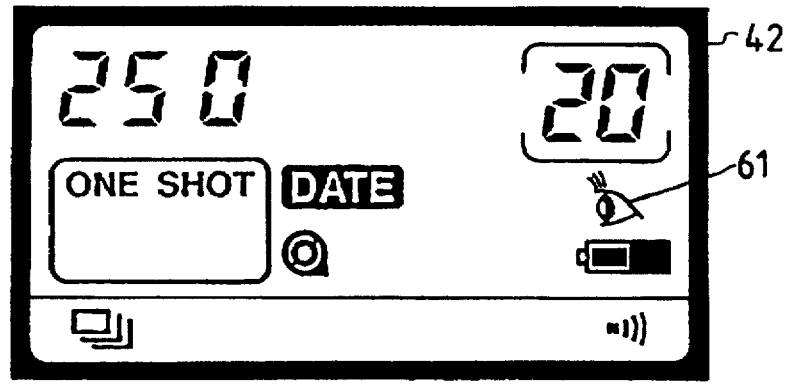
FIG. 21 is an illustration of a display of the monitoring LCD of FIGS. 2A and 2B.
Figure 22:
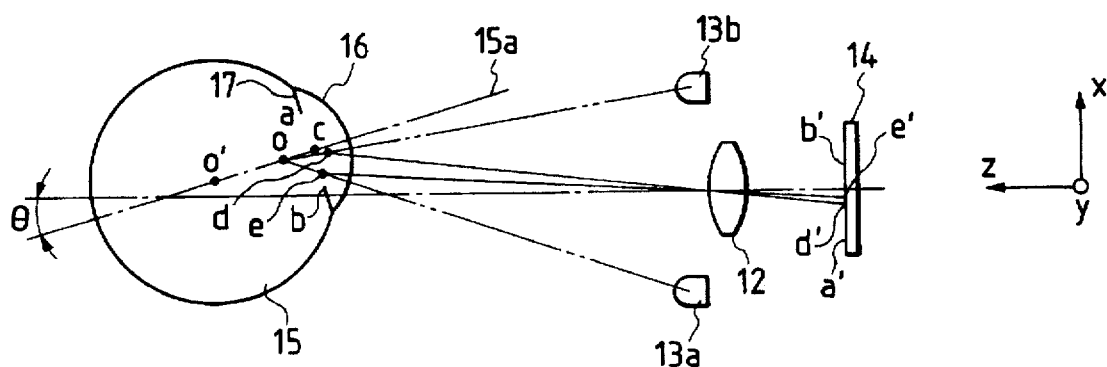
FIG. 22 is a schematic view of the essential portion of an eye-ball image.
Figure 23A:
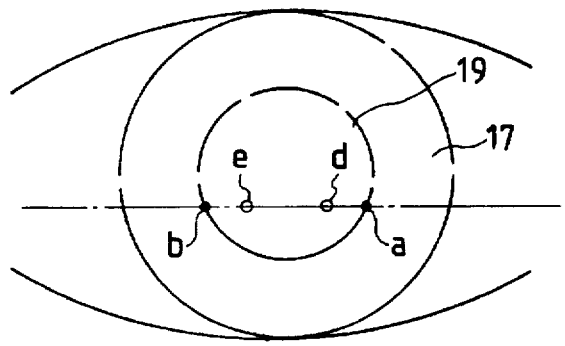
FIGS. 23A and 23B are schematic views of the essential portion of a conventional visual-axis detecting apparatus.
Figure 23B:
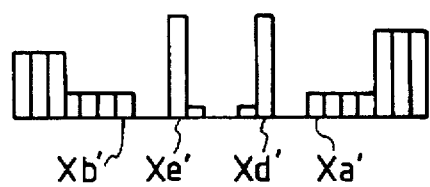

Meanwhile, the LCD 24 in the viewfinder displays the calibration mode to which the camera has been set, as shown in FIGS. 20A to 20C.

There are two calibration modes: namely, "ON" mode in which calibration is performed and "OFF" mode in which calibration is not performed.

Switching between the ON mode and the OFF mode is conducted as the photographer rotate the electronic dial 45. The signal input circuit 104 senses the rotation of the dial 45 by sensing the pulse signal as described before, and delivers a signal t the LCD driving circuit 105 through the CPU. Consequently, the content of display of the calibration mode on the monitor display LCD is changed in synchronization with the rotation of the electronic dial 45.

Clockwise rotation of the electronic dial by one click brings the monitor display LCD to display "CAL" and further one click clockwise rotation of the dial causes the display to be changed to "OFF".

In the ON mode, "CAL" is displayed by means of the 7-segment 63 which displays the shutter speed, while other fixed segment displays 24a are all turned off.

Figure 19A:
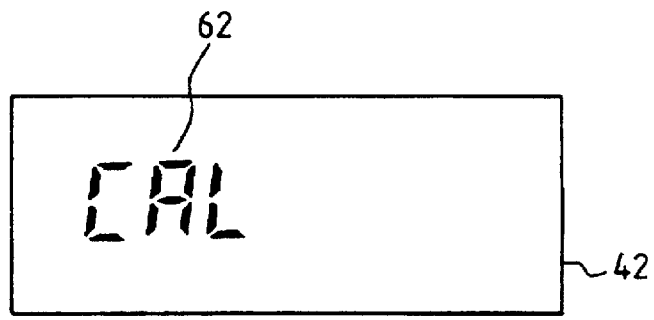
FIGS. 19A to 19C are illustrations of a display of the monitoring LCD of FIGS. 2A and 2B.
Figure 19B:
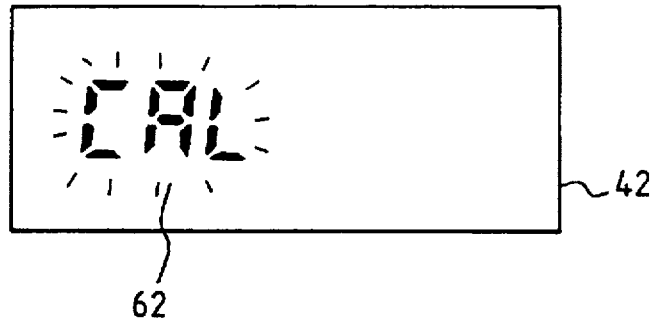
Figure 19C:
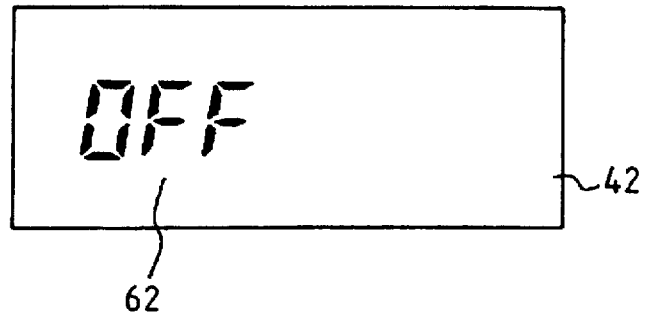

In this state, if the calibration data has not been input, the display "CAL" on the monitor display CD 42 slickers (see FIG. 19B), whereas, if the calibration data has been already input, the "CAL" displayed on the monitor display LCD 42 is fully lit on (See FIG. 19A).

In the "OFF" mode, a sign "OFF" is displayed by the 7-segment 62 (see FIG. 19C), and the camera is set to the visual axis detection inhibition mode as is the case where the calibration data has not been input, thus inhibiting entry of information based upon visual axis. This mode can suitably be used when, for example, the owner of the camera requests a person who are not familiar with the functions of this camera to take a photograph of the owner himself for the purpose of commemoration, in order to avoid wrong photographing which may otherwise be caused by the entry of the visual-axis-based information.

Then, the visible-axis detecting circuit 101 confirms the exposure mode through the signal input circuit 104 (S304). Upon confirming that the photographer has rotated the mode dial 44 to select a photographing mode other than the calibration mode (S304), the display of "CAL" by the LCD 24 in the viewfinder is turned off, and the process returns to the main routine for the photographing.

If the user has rotated the mode dial 44 to another. photographing mode, e.g., shutter-speed priority AE mode, while the sign "CAL" is displayed by the monitor display LCD 42, the visual-axis detection is conducted by using the calibration data so that photographing is conducted by incorporating the aforesaid visual-axis-based information.

In this state, a display as shown in FIGS. 20A to 20C is presented by the monitor display LCD 42. Thus, indication of the visual-axis input mode 61 is lit on besides the indication of ordinary exposure mode, thus informing the user that the camera is in the visual-axis input mode in which the photographing operation is controlled on the basis of the visual-axis information.

If the visual-axis inhibition has been selected in the calibration mode, the camera is kept inoperative until the mode is changed to a photographing mode other than the visual-axis calibration mode by the rotation of the mode dial 44.

That is to say, if the mode dial 44 is turned while "OFF" is on display, photographing operation is executed without detection of visual axis. In this case, the indication 61 of visual-axis input mode is not lit on.

Thus, the optical device, i.e., camera, performs control of various types of drives relating to photographing, in accordance with the nature of the calibration data (visual-axis correction data) stored in a RAM incorporated in the CPU 100.

The visual-axis detecting circuit 101 is arranged to commence the calibration of the visual axis in response to turning on of the switch SW1. Namely, in order to prevent that the camera by itself commences the calibration before the photographer gets ready for calibration of the visual axis, the visual-axis detecting circuit 101 confirms the state of the switch SW1 and, if the switch SW1 has been pressed into the ON state by the release button 41, the camera is kept in stand-by state until the switch SW1 is turned off (S310).

The camera also is held in stand-by state even after the switch SW1 has been turned off, unless a signal indicative of ON state of the switch SW1, which serves as a trigger signal for triggering the visual-axis calibration, is received (S314).

The photographer, while observing the visual indicator mark 1, pushes the release button 41 to turn the switch SW1 on (S314), thus triggering the detection of visual axis (S315). The operation for detecting the visual axis is the same as that explained before in connection with FIG. 9.

The visual-axis detecting circuit 101 stores the variables derived from the visual-axis detecting sub-routine, including the angles (θx, θy) of rotation of the eye ball, pupil radius rp and reliability levels of the respective data (S316).

Subsequently, the visual axis detecting circuit 101 perform a check as to whether the switch SW1 is in OFF state, through the signal input circuit 104 (S320). If the switch SW1 has been ON, the camera does not operate until the switch SW1 is turned to OFF state. Detection of the visual axis on the visual indicator mark 2 (focus point mark 204, dot mark 206) is terminated if the switch SW1 has been turned to OFF state.

Dot marks 205 and 206 are formed in the rightmost focus point mark 204 and in the leftmost focus point mark 200, indicating that the calibration is to be conducted on the basis of these two focus points. The focus point mark is intended for indicating the region where the focus detection is to be done and, therefore, should demarcate an area corresponding to such a region.

In order to attain a high accuracy of calibration, it is necessary that the photographer's view is concentrated to a limited point as possible. The dot marks 205 and 206 are provided to enable the photographer to easily concentrate the view to the limited points.

Subsequently, the visual-axis detecting circuit 101 again checks whether or not the switch SW1 has been turned on, through the signal input circuit 104 (S322). If the switch SW1 is found to be in OFF state, the camera is kept in stand-by state until the switch SW1 is turned on. Upon confirming the ON state of the switch SW1, the process executes the detection of visual axis on the indicator mark 2 (focus point mark 200, dot mark 205) (S323).

The visual-axis detecting circuit 101 then stores the variables derived from the visual-axis detecting sub-routine, including the angles (θx, θy) of rotation of the eye ball and pupil radius $r_p$, as well as reliability levels of other data (S324).

Thus, detection of visual axis has been done once for each of the visual indicator marks 1 and 2. In this embodiment, lens is stopped down in order to enable visual-axis detection to be performed again on each of the visual indicator marks at a different level of brightness in the finder. To this end, the visual-axis detecting circuit 101 sends a signal to the aperture driving circuit 111 through the CPU 100 so as to stop down the aperture 31 of the photographing lens 1 to the minimum aperture value (S326). Consequently, the view in the viewfinder becomes dark so that the photographer's eye pupil is expanded.

Then, the visual axis detecting circuit 101 checks whether or not the switch SW1 has been turned to OFF state, through the signal input circuit 104 (S310). If the switch SW1 is in ON state, the camera is held in stand-by condition until the switch SW1 is set to OFF state. If the switch SW1 is in OFF state, the detection of visual axis is finished on the indicator mark 1 (focus point mark 200, dot mark 205) (S326).

The visual-axis detecting circuit 101 checks the state of the switch SW1 through the signal input circuit 104 (S310). If the switch SW1 is in OFF state, the camera is kept in stand-by state until the switch SW1 is turned to ON state (S314). Then, Steps S314 to S324 are followed in the same manner as that described before, thus completing the visual-axis detecting operation for detecting the visual-axis calibration data based on the two indicator marks 1 and 2 at different levels of brightness for each of them.

Then, the visual-axis detecting circuit 101 sends a signal to the driving circuit 111 to fully open the aperture 31 of the photographing lens 1 (S330). Then, calibration data for calibrating visual axis is compute based on the information stored in the visual-axis detecting circuit 101, including the angles $\theta x$, $\theta y$ of rotation of the eye ball and the pupil radius $r_p$ (S331). The calculation of the calibration data is done in accordance with the following method.

Coordinates of the indicator marks 1 and 2 on the focusing plate 7 are respectively expressed by (x1, 0) and (x2, 0). Mean values of the angles ($\theta x$, $\theta y$) of the eye ball which are observed when the photographer's eye gazed at the respective indicator marks and which are stored in the visual-axis detecting circuit 101 are represented by ($\theta x1$, $\theta y1$), ($\theta x2$, $\theta y2$), ($\theta x3$, $\theta y3$) and ($\theta x4$, $\theta y4$), and mean values of the pupil radius are expressed by r1, r2, r3 and r4. More specifically, ($\theta x1$, $\theta y1$) and ($\theta x3$, $\theta y3$) Are mean values of angles of eye ball rotation as detected when the photographer gazes at the indicator mark 1, whereas ($\theta x2$, $\theta y2$) and ($\theta x4$, $\theta y4$) are mean values of angles of eye ball rotation as observed when the photographer gazes at the indicator mark 2.

Similarly, r1 and 3 are mean values of the pupil radius as obtained when the photographer looks at the indicator mark 1 and r2 and r4 are those obtained on the indicator mark 2. Suffixes 1 and 2 attached to the mean values indicates that the mean values are those obtained when the view in the viewfinder is bright, while suffixes 3 and 4 indicate that the mean values are obtained when the viewfinder is dark.

Different equations apply to the computation of the visual axis calibration data in the horizontal direction (x direction) according to the radius of the pupil attained at the time of the measurement:

① When (r3+r4)/2>rx>(r1+r2)/2

$k0=-\{(\theta x3+\theta x4)-(\theta x1+\theta x2)\}/\{2\times rx-(r1+r2)\}$ $ax=(x3-x4)/m/(\theta x3-\theta x4)$ $bOx=(\theta x3+\theta x4)/2$ ② When rx≥(r3+r4)/2>(r1+r2)/2

$k0=-\{(\theta x3+\theta x4)-(\theta x1+\theta x2)\}/\{(r3+r4)-(r1+r2)\}$ $ax=(x3-x4)/m/\{\theta x3+\theta x4+k0\times(r3-r4)\}$ $bOx=-k0\times\{(r3+r4)/2-rx\}-(\theta x3+\theta x4)/2$ At the same time, the visual-axis calibration data in the vertical direction (y direction) is calculated in accordance with the following equations.

Figure 24:
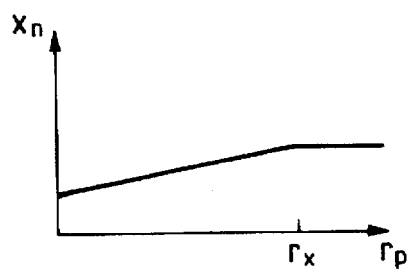
FIG. 24 is a characteristic view illustrating the relationship between the visual axis and the radius of the pupil.

$ky=-\{(\theta y3+\theta y4)-(\theta y1+\theta y2)\}/\{(r3+r4)-(r1+r2)\}$ $bOy=\{(\theta y1+\theta y2)\times(r3+r4)-(\theta y3+\theta y4)\times(r1+r2)\}/2/\{(r1+r2)-(r3+r4)\}$ FIG. 24 shows the relationships between the visual axis and the pupil radius.

If the visual-axis calibration data as computed is determined to be incorrect (S332), the visual-axis detecting circuit 101 sends a signal through the CPU 100 to the LCD driving circuit 105, thereby flickering the indication of "CAL" presented by the LCD 24 in the viewfinder, thereby informing that the calibration has failed (S340) (See FIG. 20A). Then, the process advances to the initial step (S301) of the calibration routine, thus setting the camera again to a state capable of executing the visual-axis calibration.

Conversely, if the computed visual-axis calibration data is correct or adequate (S332), the visual-axis detecting circuit 101 activates the LCD driving circuit 105 thereby causing the LCD 24 in the viewfinder to display "END", thus completing the calibration (S332) (FIG. 20B).

The visual-axis detecting circuit 101 further operates to store the computed visual-axis calibration data, eyeglass information concerning the photographer's eyeglass and the level of reliability of the computed visual-axis calibration data in a RAM at the address corresponding to the calibration data (S335). If the above-mentioned address of the RAM has already stored visual-axis calibration data, such old data is replaced with the presently computed calibration data, i.e., the content of the memory is updated.

The level of reliability o the visual-axis correction data is thus determined, on the basis of which the visual-axis detection is executed, thus making it possible to control the optical device with a high degree of accuracy.

After completion of a series of calibration of visual axis, the photographer rotates the mode dial 44 to select another photographing mode, the visual-axis detecting circuit 101 detects the change of the photographing mode through the signal input circuit 104 (S337), so that the process returns to the main routine (S338). If the calibration data has not been input when the process returns to the main routine, the visual-axis detecting circuit 101 forcibly sets the camera to the visual-axis inhibition mode.

In the described embodiment, the indication of the visual-axis detecting operation is performed by the LCD which can be viewed in the viewfinder and which is lit on or made to flicker for easy recognition by human eye. This, however, is only illustrative and the indication of the visual-axis detecting operation may be performed by modifying the monitor display LCD 42 shown in FIG. 7A for performing the visual-axis input display 61, such that this display also has the same function as the visual-axis input mark 78 presented by the LCD 24 in the viewfinder of the described embodiment, i.e., such that the monitor display LCD 42 is lit on when the detection of visual axis is being conducted and is turned off when calibration data has not been input or when the camera is in the visual-axis inhibition mode or when the camera is held in vertical posture, so as to inform the photographer that the visual-axis detecting operation s being conducted.

It is also possible to use such a display function that a display is turned on when the visual-axis detecting operation is being conducted while the camera is held in a posture other than the vertical posture but is made to flicker when the calibration data has not been input, when the camera has been set to the visual-axis inhibition mode or when the camera is held in the vertical posture.

In the described embodiment, the visual-axis detecting operation is inhibited when the camera is held in the vertical posture. Such inhibition, however, is not essential and the visual-axis detection may be conducted even when the camera is held in the vertical posture, with indication of the execution of the visual-axis detecting operation.

Thus, the camera of the described embodiment, having a visual-axis detecting device which computes the visual axis of the photographer's eye based upon the angles of rotation of the optical axis of the eye ball of the photographer's eye, comprises: posture detecting means for detecting the posture of the camera; and visual-axis correcting means for correcting any error in the detection of the visual axis caused by difference in the eye ball according to individual photographer, the visual-axis detecting means being adapted to selectively inhibit detection of the visual axis according to the posture of the camera. It is therefore possible to prevent erroneous operation of the camera attributable to wrong visual-axis detection data.

The camera may have such a function as to inform the photographer that the visual-axis detecting operation has been suspended, when the detection is not being conducted due to a posture of the camera other than a predetermined posture, thus improving the use of the camera.

The visual-axis detecting device also can have such a function as to alter the indication of the visual-axis detection according to the posture of the camera, so as to inform that the accuracy of the visual-axis detection has been changed due to difference in the posture of the camera, thereby improving reliability of the camera.

A description will now be given of another embodiment of the present invention.

In the embodiment described before, the camera posture detecting means operates to inhibit the detection of the visual axis direction when the camera is held in vertical posture, and automatic selection of the focus point is put into effect while a display is made to inform that the camera is held in the vertical posture.

In contrast, in the embodiment which will now be described, the visual-axis detecting operation is conducted even when the camera is held in the vertical posture, under a certain limited condition. The following description will be focused on features which do not appear in the foregoing description taken in conjunction with FIG. 8.

FIG. 16A shows that the focus point mark 201 has been selected out of five focus points marked by 200, 201, 202, 203 and 204, while the camera is held in a posture other than vertical.

In the visual-axis detection conducted while the camera is held in the vertical posture, the outermost focus points denoted by 200 and 204 are most significantly affected by the eyelid. These outermost focus points 200, 204, therefore, are excluded from the selection of the focus points which is to be conducted in accordance with the result of detection of the optical axis.

Thus, in this embodiment, the focus point marked by 201 has been selected out of three denoted by 201, 202 and 203.

Furthermore, in order to inform the photographer that the focus points marked by 200 and 204 are never selected, the visual-axis input mark 78 presented by the LCD 24 in the viewfinder is made to flicker, as shown in FIG. 17A.

Figure 17D:
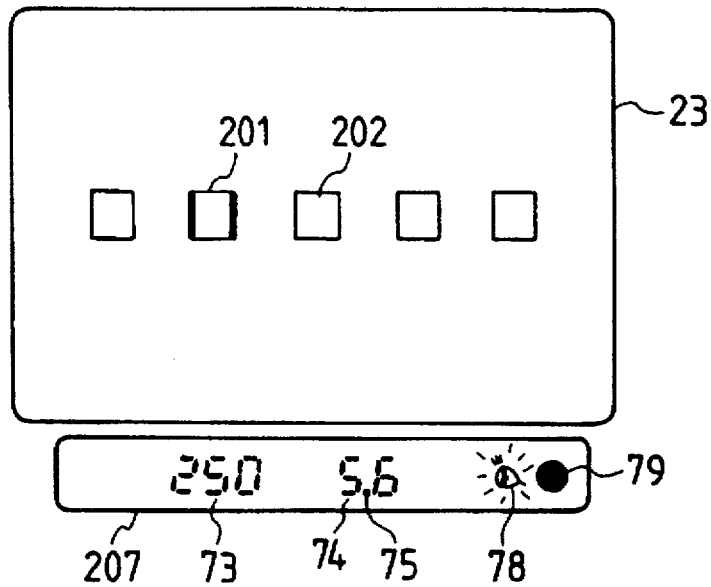
Figure 18:
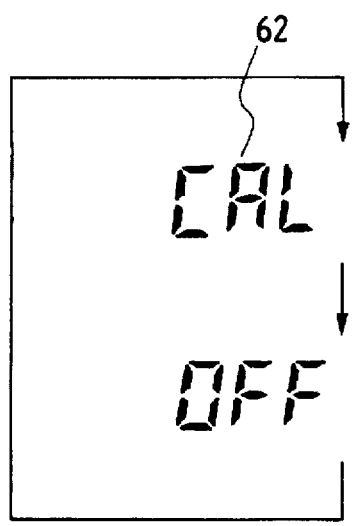
FIG. 18 is an illustration of a display of the monitoring LCD of FIGS. 2A and 2B.

Referring again to FIG. 8, when in-focus state has not been established on a focusable focus point selected in accordance with a predetermined algorithm (S109), the CPU 100 operates to send a signal to the lens focus control circuit 110 to drive the photographing lens 1 by a predetermined amount (S117). After the driving of the lens, the automatic focus detecting circuit 103 again conducts the focusing operation (S107) to determine whether the photographing lens 1 is in in-focus state (S109). In in-focus state has been attained on the selected focus point, the CPU 100 ends a signal to the LCD drive circuit 105 so as to light up the in-focus mark 9 presented by the LCD 24 in the viewfinder. At the same time, the CPU 100 sends a signal also to the LED drive circuit 106 to make the focus point mark 201 display the in-focus state (S110). Thus, a display as shown in FIG. 16B is obtained when the camera posture is not vertical, whereas, when the camera is held in the vertical posture, a display is obtained as shown in FIG. 17D.

Meanwhile, the flickering of the focus point mark of the focus point selected based on the visual axis is terminated. Since in most cases the focus point on which the in-focus display is to be presented coincides with the focus point selected based on the visual-axis information. In this embodiment, therefore, the focus point on which the in-focus state has been obtained is lit on. The photographer may find that the focus point on which the in-focus state is displayed is not the focus point on which the photographer intends to focus the camera. In such a case, the photographer relieves the release button 41 to allow the switch SW1 turn off (S111), so that the camera is kept in stand-by state until the switch SW1 is turned on (S102).

If the photographer continues to keep the switch SW1 in on state after confirming the focal point on which the in-focus display is presented (S111), the CPU 100 operates to send a signal to the photometering circuit 102, thus triggering the photometering operation (S112), so that the exposure value is computed. The composition of the exposure value is executed while giving suitable weight to one of the photometering regions 210 to 213 containing the focus point on which the in-focus state has been obtained.

In the illustrated embodiment, a known photometering operation is conducted while giving weight to the photometering region 210 containing the focus point 201, and an aperture value (F5.6) is displayed as a result of the computation, by using the 7-segment display 74 and the decimal point display 75, as will be seen from FIGS. 16A, 16B, 17A, 17B, 17C and 17D.

Then, whether or not the switch SW2 has been turned on by further pressing of the release button 41 is determined (S113). If the switch SW2 is in OFF state, the state of the switch SW1 is checked again (S111). Conversely, if the switch SW2 has been turned to ON state, the CPU 110 sends signals to the shutter control circuit 108, motor control circuit 109 and the aperture drive circuit 111.

Figure 25:
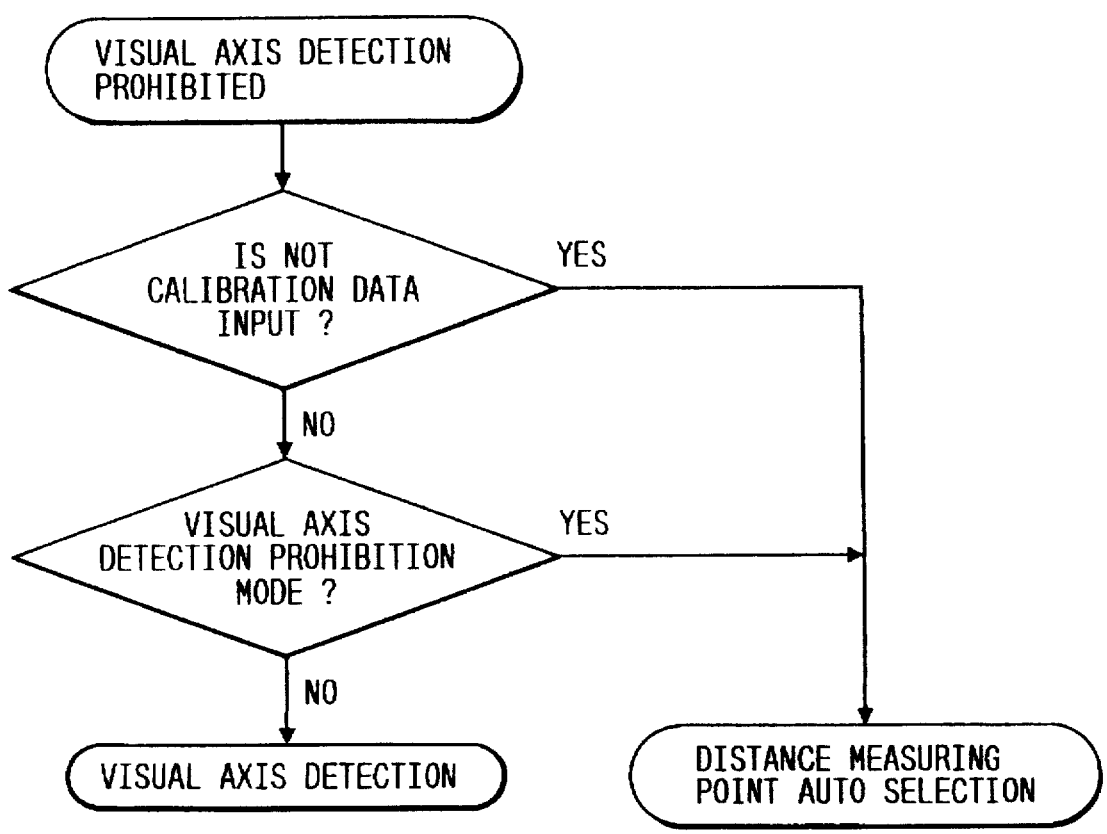
FIG. 25 is a flowchart showing visual-axis detection.

FIG. 25 is a flow chart showing the process for determining whether the visual-axis detection is possible. This flow is similar to that shown in FIG. 10 but lacks some steps of the flow of FIG. 10. As the first step, the camera determines whether the calibration data has been input. If the calibration data has not been input, the process skips to the automatic focus point selection routine without conducting the visual-axis detecting operation. Conversely, if the calibration data has been entered, a check is made as to whether the aforementioned visual-axis detection inhibition mode is valid. If the camera has been set to this mode, the process proceeds to the automatic focus point selection routine. If not, the process returns to the main routine.

Referring back to FIGS. 11 and 12 which are flow charts showing the process for detecting visual axis, as stated before, the visual-axis detecting circuit 101 executes the visual-axis detecting operation upon receipt of a signal from the CPU 100 (S104). The visual axis detecting circuit 101 then determines whether the visual-axis detection now executed is being done in the exposure mode or in the visual-axis calibration mode (S201).

If the present mode is an exposure mode, the visual-axis detecting circuit 101 determines, based on a signal derived from the detecting means 27 via the signal input circuit 104, whether or not the camera is held in the vertical posture (S202).

Then, successive steps are followed in the same manner as that described before.

On the other hand, if the camera is held in vertical posture, either the combination of the IREDs 13a, 13e or the combination of IREDs 13b, 13f, which can illuminate the photographer's eye ball from the lower side is selected.

In the described embodiment, the camera employs five regions for selection in accordance with the result of detection of the visual axis, the selected region corresponds to a focus point, the selection is done out of all the five focus points when the camera is held in a posture other than vertical and out of three focus points excepting the two outermost focus points when the camera is held in the vertical posture. This, however, is only illustrative and the camera can have seven regions arrayed on the horizontal axis of the view in the viewfinder so that selection is done out of all these seven focus points when the camera is held in a posture other than vertical and out of three focus points, excepting two at each end of the array, when the camera is held in the vertical posture. It is also to be understood that the regions to be selected need not always coincide with the focus points.

A different embodiment of the invention will now be described.

The focus point selection algorithm explained in connection with the first embodiment is effective when a focus point is selected from a plurality of focus points arranged in the horizontal direction in a horizontally-elongated photographing frame.

Therefore, when the camera is held vertically, i.e., in a position turned 90° from the ordinary horizontal posture, a difference in the amount of defocus is caused between the focus point which is on the upper end of the array and the focus point which is on the lower end of the array. Thus, the characteristics are different from those in the photographing in ordinary camera posture.

The embodiment which will now be described is capable of performing focus detection with high degree of precision even when the camera is held in the vertical posture.

A description will now be given of the automatic focus point selecting sub-routine (S116) with specific reference to FIG. 26.

As stated before, this sub-routine is used for the purpose of selecting the focus point based upon the information concerning the amounts of defocus at the respective focus points and the absolute distance, when the calibration data has not been input yet or when the camera is set to visual-axis detection inhibition mode, i.e., when the camera is not set to the visual-axis input mode.

Steps S601 to S602 and Step S607 are not described because these steps are the same as the Steps S501 to S502 and S507 described before.

In Step S602, if there are two focusable focus points, whether the camera is held in vertical posture or not is detected based on a signal derived from the detecting means 27 through the signal input circuit 104 (S603).

Figure 28:
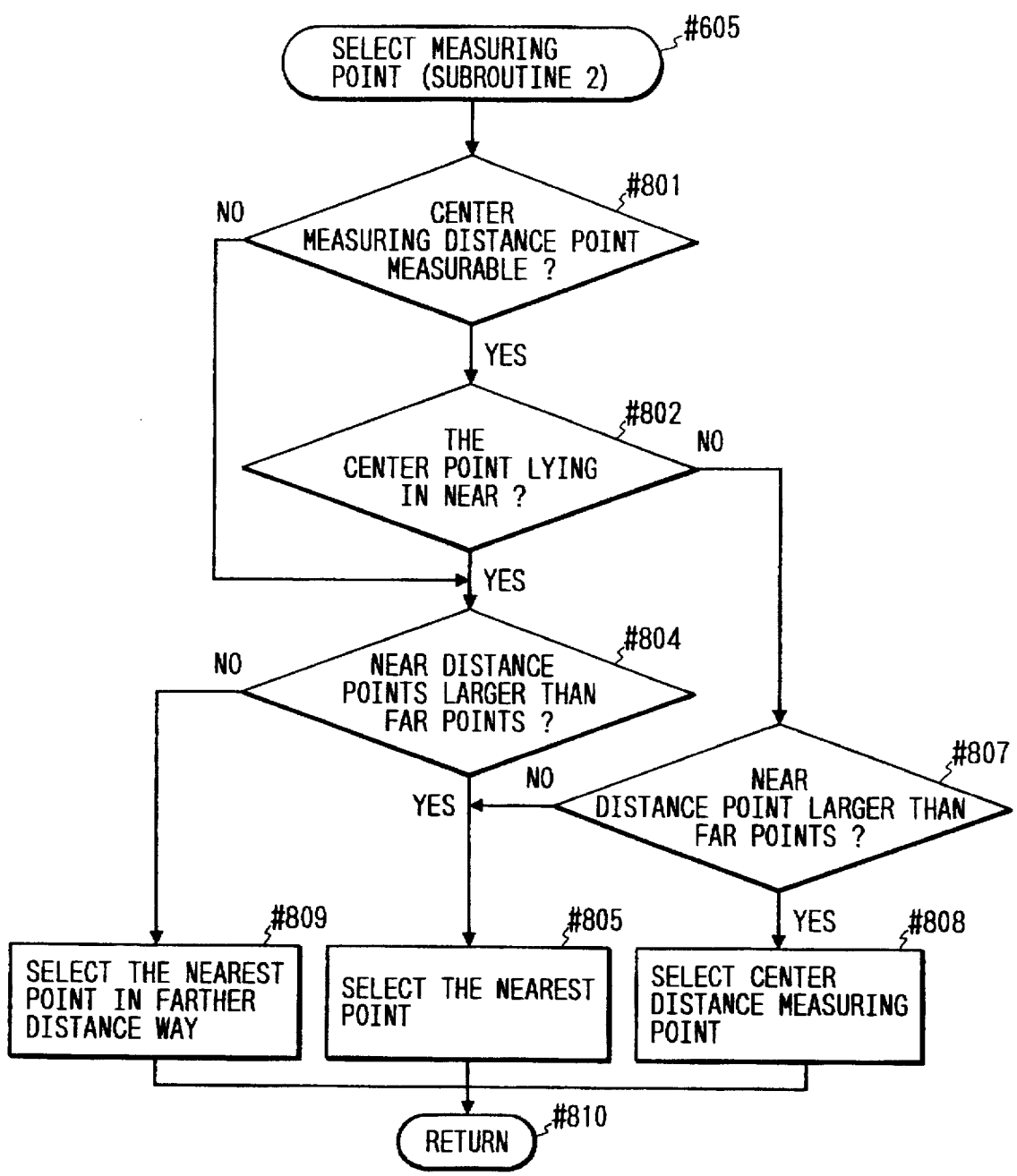
FIG. 28 is a flowchart of a subroutine of FIG. 26.

If the camera is held in a position other than vertical, the process proceeds to the automatic focus point selection sub-routine 2. The content of the focus point selection sub-routine 2 shown in FIG. 28 is the same as Steps S503 to S511 of the flow shown in FIG. 9 so that detailed description is omitted in regard to this sub-routine.

Figure 27:
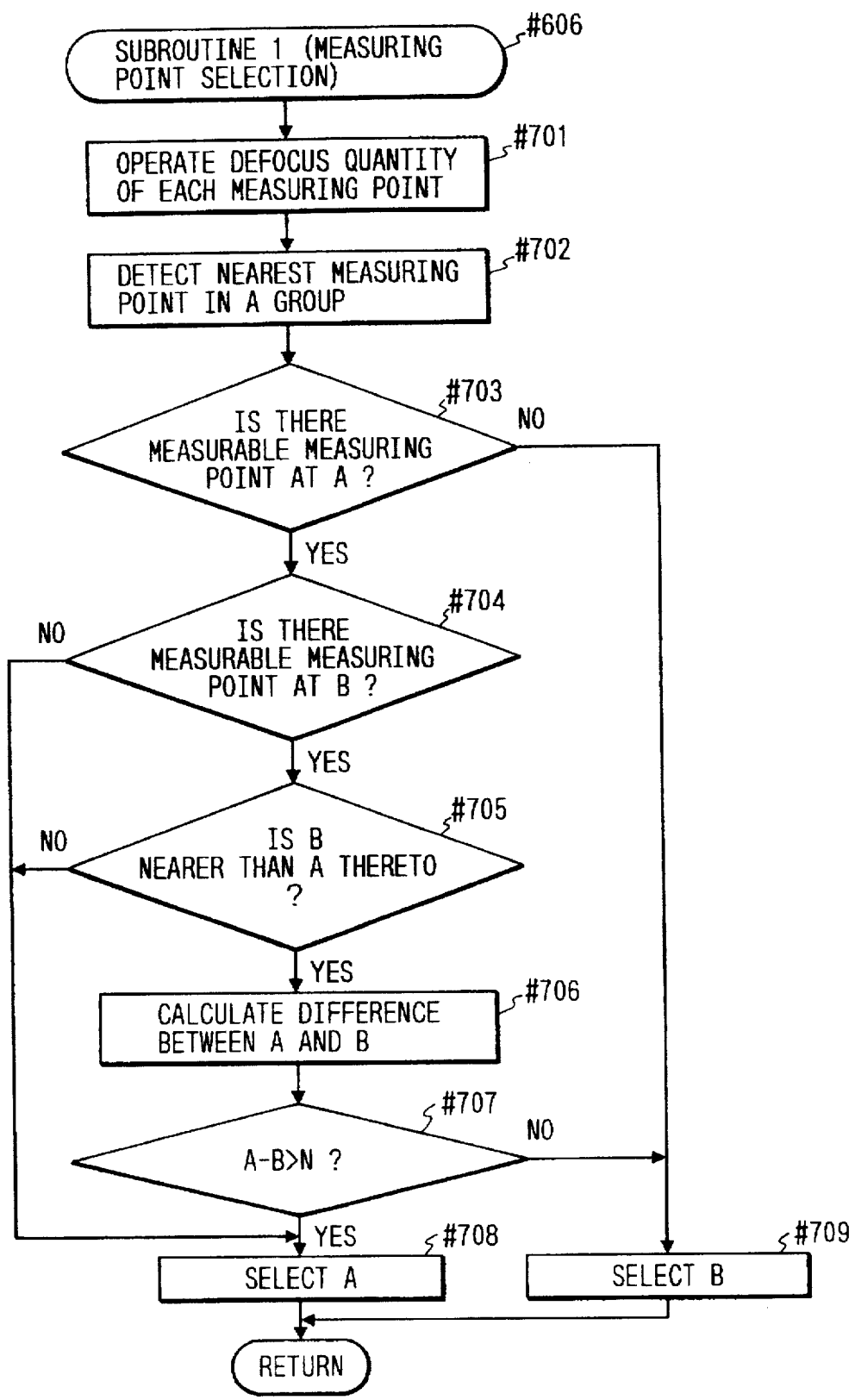
FIG. 27 is a flowchart of a subroutine of FIG. 26.

If the camera is held in vertical posture, the process advances to a focus point selection sub-routine 1, the flow of which is shown in FIG. 27.

The five focus points displayed in the viewfinder by focus point marks 200 to 204 shown in FIG. 3 are divided into two groups each include successive focus points.

In this case, a group A is formed of the focus points indicated by the focus point marks 200, 201 and 202, while a group B includes focus points indicated by the focus point marks 203 and 204. Then, amounts of defocus are determined on all the focus points in the groups A and B (S701). Subsequently, the closed point is determined in each group based upon the determined amounts of defocus (S702).

The amount of defocus on the closest point in the group A is represented by "A", while the amount of defocus on the closest point in the group B is represented by "B". Then, a determination is conducted as to whether any focusable focus point exists in the group A. If there is no focusable focus point, the closest point in the group B is selected and the defocus amount B on the closest point in the group B is determined as the final amount of defocus (S709). The process then returns.

If the group A contains a focusable focus point, while no focusable point is contained in the group B, the closest point in the group A is selected so that the defocus amount A on this point is determined as the final defocus amount (S708). The process then returns.

When both the groups A and B contain focusable focus points, in which one of these groups the closest point exists is determined based upon the amounts A and B of defocus obtained in these groups (S705). If the closest point in the group B is determined as being the closest among the focus points in both groups A and B, a computation is conducted to determine the difference between the amount of defocus of the closest point in the group A and that in the group B (S706).

If the difference between two defocus amounts A and B is greater than a preset value N, the closest point in the group A is selected and the defocus amount A on this point is determined as the final defocus amount (S708).

Conversely, if the difference is smaller than the preset value N, the closest point in the group B is selected and the defocus amount B on this point is determined as being the final defocus amount.

The above-mentioned preselected value N is used as a threshold for the evaluation of the difference between the defocus amounts on the closest points in the groups A and B, to provide a criterion for the determination as to whether the closest point in the group B corresponds to the main subject to be photographed, when the closest point in the group B is the closest among all the points in the groups A and B.

As a result of the selection of the focus point as described, the selected main focus point corresponds to the main subject, even when a focusable object exists which is closer to the photographer and which is near the bottom of the view in the viewfinder of the camera which is held in vertical posture.

In this case, focus point mark 201 and the in-focus mark 79 are lit on as shown in FIG. 16B as is the case of the in-focus display on the focus point selected based upon the visual-axis information described before. In this case, needless to say, the visual-axis input mark 78 is not lit on.

Thus, in this embodiment, the camera has five selectable regions as focus points for selection by the automatic focus point selection function, wherein the selection is done out of all the five focus points when the camera is held in a position other than vertical, whereas, when the camera is held in the vertical posture, the selection is conducted by grouping the focus points into two groups having consecutive three and two focus points, respectively. This, however, is only illustrative and the arrangement may be such that the camera has seven focus points arrayed on a horizontal line in the viewfinder so that selection of the focus point is done out of all these seven focus points when the camera posture is not vertical, whereas, when the camera is held in the vertical posture, the selection is done on the basis of information derived from two groups of focus points including four and three successive focus points, respectively.

Furthermore, although in the described embodiment the selection of the focus point is conducted on the basis of determination of closest points in the two groups of the focus points, the described arrangement may be modified such that the focus points are grouped into three or more groups.

As will be understood from the foregoing description, according to the present invention, selection of focus point can be conducted by using different automatic focus point selection algorithms according to the posture of the optical device, e.g., a camera. It is therefore possible to obtain a higher accuracy of focus detection on any type and position of the subject regardless of whether the camera is held in vertical or horizontal posture during photographing.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. An optical apparatus, comprising:
   visual-axis detecting means for detecting a direction of a visual axis of an operator;
   posture detecting means for detecting a posture of said optical apparatus;
   control means for controlling said optical apparatus on the basis of an output from said visual-axis detecting means; and
   display means for respectively displaying different display patterns that indicate respective visual-axis detection modes for a first posture of said optical apparatus and a second posture in which said optical apparatus is rotated by 90 degrees from the first posture, said display means displaying a symbol for indicating a visual axis of the eye using different display patterns.

2. An optical apparatus according to claim 1, wherein said optical apparatus includes a camera.

3. An optical apparatus according to claim 1, wherein said displaying means illuminates said symbol to indicate said first posture and flickers said symbol to indicate said second posture.

4. An optical apparatus according to claim 1, wherein said displaying means illuminates said symbol to indicate said first posture and deilluminates said symbol to indicate said second posture.

5. A camera comprising:
   visual axis detecting means for detecting information relating to a visual axis of an eye
   controlling means for controlling said camera based on said information relating to the visual axis of the eye;
   posture detecting means for detecting a posture of said camera; and
   display means for displaying a symbol indicating the detected visual axis of the eye, said display means illuminating or deilluminating said symbol according to a detection result of said posture detecting means.

6. A camera according to claim 5, wherein said posture detecting means comprises a detector for detecting the posture of said camera.

7. A camera according to claim 5,
   wherein said controlling means selects one of a plurality of measuring areas in accordance with the detected visual axis, and
   wherein said controlling means performs a focusing operation on the selected measuring area.

8. A camera according to claim 5,
   wherein said controlling means selects one of a plurality of measuring areas in accordance with the detected visual axis, and
   wherein said controlling means controls the amount of exposure, and weighs the brightness of the selected measuring area.

9. A camera according to claim 5,
   wherein the symbol is not illuminated when a top or bottom surface of said camera is oriented in a vertical direction and wherein the symbol is illuminated when the top or bottom surface of said camera is oriented in a horizontal direction.

10. A camera according to claim 9, wherein said posture detecting means comprises a detector for detecting the posture of said camera.

11. A camera according to claim 9,
    wherein said controlling means selects one of a plurality of measuring areas in accordance with the detected visual axis, and
    wherein said controlling means performs a focusing operation on the selected measuring area.

12. A camera according to claim 9,
    wherein said controlling means selects one of a plurality of measuring areas in accordance with the detected visual axis, and
    wherein said controlling means controls the amount of exposure and weighs the brightness of the selected measuring area.

13. A camera according to claim 9,
    wherein said controlling means selects one of a plurality of measuring areas in accordance with the detected visual axis, and
    wherein said controlling means performs a focusing operation on the selected measuring area, controls the amount of exposure, and weighs the brightness of the selected measuring area.

14. A camera comprising:
    visual axis detecting means for detecting information relating to a visual axis of an eye;
    controlling means for controlling said camera based on said information relating to the visual axis of the eye;
    posture detecting means for detecting a posture of said camera; and
    display means for displaying a symbol indicating the detected visual axis of the eye, wherein said display means illuminates or flickers said symbol according to a detection result of said posture detecting means.

15. A camera according to claim 14, wherein said posture detecting means comprises a detector for detecting the posture of said camera.

16. A camera according to claim 14,
wherein said controlling means selects one of a plurality of measuring areas in accordance with the detected visual axis, and
wherein said controlling means performs a focusing operation on the selected measuring area.

17. A camera according to claim 14,
wherein said controlling means selects one of a plurality of measuring areas in accordance with the detected visual axis, and
wherein said controlling means controls the amount of exposure and weighs the brightness of the selected measuring area.

18. A camera according to claim 14,
wherein the symbol does not flicker when a top or bottom surface of said camera is oriented in a vertical direction and wherein the symbol is illuminated when the top or bottom of said camera is oriented in a horizontal direction.

19. A camera according to claim 18, wherein said posture detecting means comprises a detector for detecting the posture of said camera.

20. A camera according to claim 18,
wherein said controlling means selects one of a plurality of measuring areas in accordance with the detected visual axis, and
wherein said controlling means performs a focusing operation on the selected measuring area.

21. A camera according to claim 18,
wherein said controlling means selects one of a plurality of measuring areas in accordance with the detected visual axis, and
wherein said controlling means controls the amount of exposure and weighs the brightness of the selected measuring area.

22. A camera according to claim 18,
wherein said controlling means selects one of a plurality of measuring areas in accordance with the detected visual axis, and
wherein said controlling means performs a focusing operation on the selected measuring area, controls the amount of exposure, and weighs the brightness of the selected measuring area.

23. A camera comprising:
measuring means for performing a measurement relating to each of a plurality of measuring areas selectable in an object to be photographed;
posture detecting means for detecting a posture of said camera;
means for displaying a mark corresponding to each of said plurality of measuring areas in a viewfield;
visual axis detecting means for detecting a direction of visual axis of a user; and
controlling means for controlling said camera based on a detection result of said visual axis detecting means, wherein said controlling means selects a measuring area corresponding to a mark to which said visual axis is directed in said plurality of measuring areas to control said camera based on a measurement result relating to said selected measuring area and said controlling means sets a non-selected area when said posture detecting means detects that said camera is in a predetermined posture.

24. A camera according to claim 23, wherein said posture detecting means comprises a posture detector for detecting the posture of said camera.

25. A camera according to claim 23,
wherein said controlling means performs a focusing operation on the selected measuring area.

26. A camera according to claim 23,
wherein said controlling means controls the amount of exposure and weighs the brightness of the selected measuring area.

27. A camera according to claim 23,
wherein said controlling means performs a focusing operation on the selected measuring area, controls the amount of exposure, and weighs the brightness of the selected measuring area.

28. A camera according to claim 23,
wherein the number of the selectable measuring areas when a top or bottom surface of said camera is oriented in a vertical direction is less than the number of the selectable measuring areas when the top or bottom surface of said camera is oriented in a horizontal orientation.

29. A camera according to claim 28, wherein said posture detecting means comprises an orientation detector for detecting the posture of said camera.

30. A camera according to claim 28,
wherein said controlling means performs a focusing operation on the selected measuring area.

31. A camera according to claim 28,
wherein said controlling means controls the amount of exposure, and weighs the brightness of the selected measuring area.

32. A camera according to claim 28,
wherein said controlling means performs a focusing operation on the selected measuring area, controls the amount of exposure, and weighs the brightness of the selected measuring area.

33. A camera according to claim 28,
wherein a single measuring area is provided in a center portion of a display of said displaying means and two sets of two measuring areas are respectively provided on both sides of the center portion when a top or bottom surface of said camera is oriented in a horizontal orientation, or
a single measuring area is provided in a center portion of a display of said displaying means and a single measuring area is provided on each of both sides of the center portion when a top or bottom surface of said camera is oriented in a vertical orientation.

34. A camera according to claim 28,
wherein a single measuring area is provided in a center portion of a display of said displaying means and two sets of three measuring areas are respectively provided on both sides of the center portion when a top or bottom surface of said camera is oriented in a horizontal orientation, or
a single measuring area is provided in the center portion and two sets of two measuring areas are respectively provided on both sides of the center portion when a top or bottom surface of said camera is oriented in a vertical orientation.

35. A camera comprising:
measuring means for performing a measurement relating to each of a plurality of measuring areas in an object to be photographed;

detecting means for detecting a posture of said camera; and controlling means for automatically selecting a measuring area of the plurality of measuring areas and for controlling said camera based on a measurement result related to the automatically selected measurement area, wherein said controlling means selectively operates a plurality of mutually different algorithms, and said controlling means selects an algorithm from among said plurality of mutually different algorithms according to a detection result of said detection means and selects the measuring area from among the plurality of measuring areas by using the selected algorithm.

36. A camera according to claim 35, wherein said controlling means performs a focusing operation on the selected measuring area.

37. A camera according to claim 36, wherein said controlling means performs the automatic selection according to mutually different algorithms when a top or bottom surface of said camera is oriented in a horizontal orientation and when the top or bottom surface of said camera is oriented in a vertical orientation.

38. A camera according to claim 37, further comprising visual axis detecting means for detecting to which measuring area a visual axis of the eye of a user of said camera is directed, and wherein said controlling means performs a focusing operation according to the detection of said visual axis detecting means.

39. A camera according to claim 37, further comprising visual axis detecting means for detecting to which measuring area a visual axis of the eye of a user of said camera is directed, and wherein said controlling means controls the amount of exposure according to the detection of said visual axis detecting means.

40. A camera according to claim 37, further comprising visual axis detecting means for detecting to which measuring area a visual axis of the eye of a user of said camera is directed, and wherein said controlling means performs a focusing operation according to the detection of said visual axis detecting means and controls the amount of exposure according to the detection of said visual axis detecting means.

41. A camera according to claim 37, wherein said controlling means performs the automatic selection according to an algorithm such that a measuring area existing at an upper portion of said plurality of measuring areas is preferentially selected when a top or bottom surface of said camera is oriented in a vertical orientation.

42. An apparatus comprising:

visual axis detecting means for detecting information relating to a visual axis of an eye;

controlling means for controlling said apparatus based on said information relating to the visual axis of the eye;

posture detecting means for detecting a posture of said apparatus; and display means for displaying a symbol indicating the detected visual axis, wherein said display means changes a state of display of the symbol according to a detection result of said posture detecting means.

43. An apparatus according to claim 42, wherein said displaying means illuminates or flickers said symbol according to a detection result of said posture detecting means.

44. An apparatus according to claim 42, wherein said displaying means illuminates or deilluminates said symbol according to a detection result of said posture detecting means.

45. An apparatus comprising:

measuring means for performing a measurement relating to each of a plurality of measuring areas of an object;

display means for displaying a mark corresponding to each of said plurality of measuring areas in a viewfield;

visual axis detecting means for detecting the direction of the visual axis of a user;

detecting means for detecting a posture of said apparatus; and controlling means for controlling said apparatus based on a detection result of said visual axis detecting means, wherein said controlling means selects a measuring area corresponding to a mark to which said visual axis is directed from among said plurality of measuring areas to control said apparatus based on a measurement result relating to said selected measuring area and, wherein if said posture detecting means detects that said apparatus is in a predetermined posture, then said controlling means defines an area of said plurality of measuring areas as a measuring area where said apparatus is not controlled based on a measuring result relating to said area defined by said controlling means.

46. An apparatus comprising:

measuring means for performing measurement relating to each of a plurality of measuring areas;

detecting means for detecting a posture of said apparatus; and controlling means for automatically selecting an area of said plurality of measuring areas to control said apparatus based on a measurement result in the automatically selected area, wherein said controlling means selects an algorithm from among a plurality of mutually different algorithms according to a detection result of said detecting means and performs said automatic selection with the selected algorithm.

* * * * *

UNITED STATES PATENT AND TRADEMARK OFFICE
CERTIFICATE OF CORRECTION

PATENT NO. : 5,734,930
DATED : March 31, 1998
INVENTOR(S) : SHINICHI HAGIWARA

It is certified that error appears in the above-indentified patent and that said Letters Patent is hereby corrected as shown below:

At [56] References Cited

FOREIGN PATENT DOCUMENTS

"2-422" should read --4-422--.

Sheet 9

Figure 8B, "CANNOT MEASURING DISTANCE" should read --MEASURING DISTANCE CANNOT--.

Sheet 24

Figure 26:
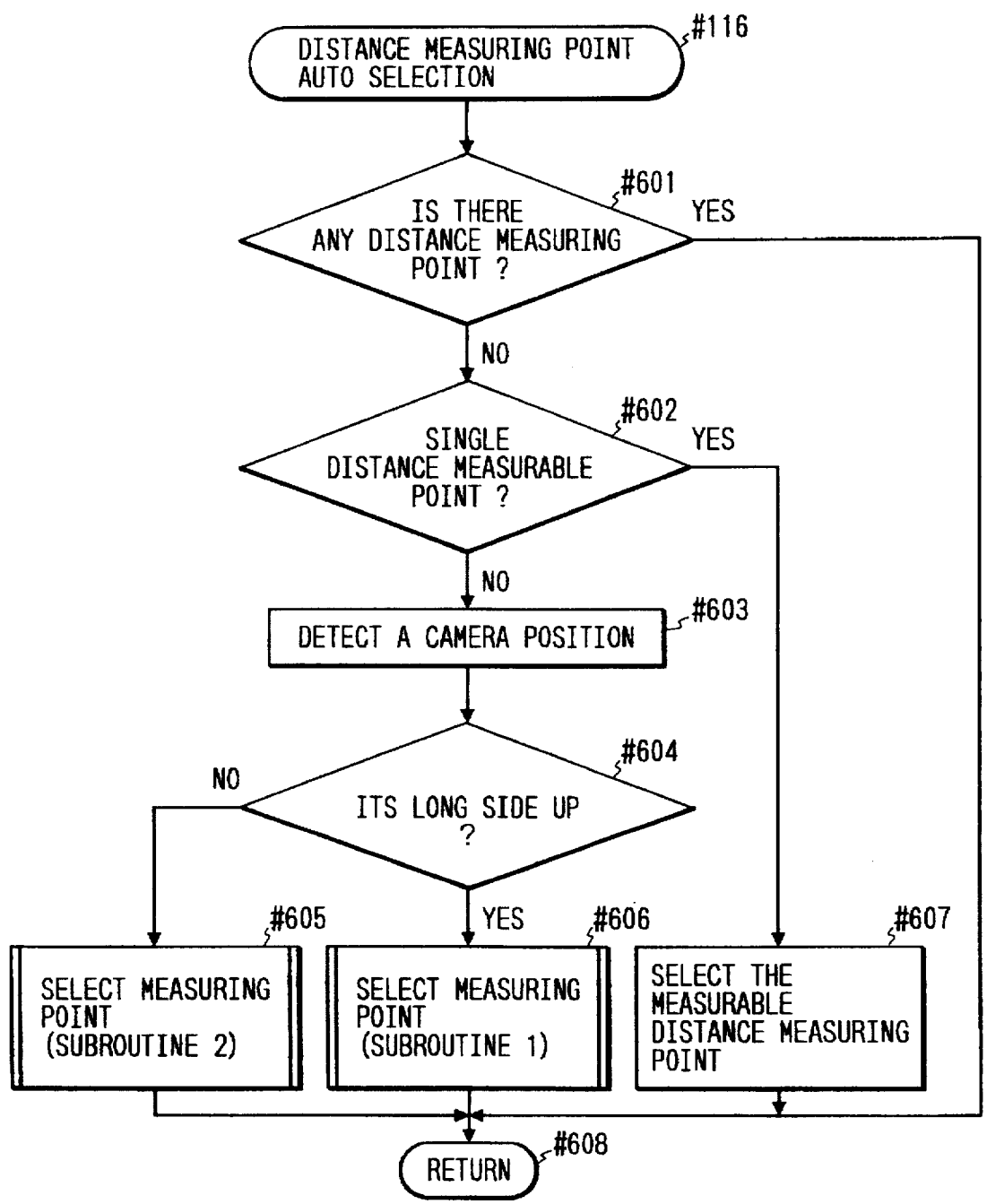
FIG. 26 is a flowchart showing an automatic focus-point selection.

Figure 26, MEASURABLE" should read --MEASURING--.

Column 5

Line 28, "convenience, it" should read --convenience--.
    Line 29, "is" should be deleted.
    Line 52, "penta prism" should read --penta-prism--.
    Line 59, "penta prism" should read --penta-prism--.

Column 9

Line 49, "62;" should read --62,--.

UNITED STATES PATENT AND TRADEMARK OFFICE
CERTIFICATE OF CORRECTION

PATENT NO. : 5,734,930     Page 2 of 5
DATED : March 31, 1998
INVENTOR(S) : SHINICHI HAGIWARA It is certified that error appears in the above-indentified patent and that said Letters Patent is hereby corrected as shown below:

Column 10

Line 19, "of" should read --of the--.
Line 31, "algorithm" should read --algorithm,--.
Line 55, "superimpose" should read --superimposed--.
Line 57, "of" should read --of the--.
Line 65, "in on" should read --in an on--.

Column 11

Line 10, "in-focus" should read --in focus--.
Line 16, "in" should read --in an--.
Line 30, "lighted" should read --lit--.
Line 31, "in" should read --in an--.
Line 37, "in on" should read --in an on--.

Column 12

Line 2, "sequence is" should read --sequences are--.
Line 28, "next" should read --the next--.
Line 29, "determined" should read --determines--.
Line 60, "when" should read --when an--.

Column 13

Line 8, "whether" should read --it is determined whether--.
Line 35, "COU" should read --CPU--.
Line 45, "eyeglass" should read --eyeglasses--.
Line 46, "remoter" should read --more remote--.

UNITED STATES PATENT AND TRADEMARK OFFICE
CERTIFICATE OF CORRECTION

PATENT NO. : 5,734,930

DATED : March 31, 1998

INVENTOR(S) : SHINICHI HAGIWARA

It is certified that error appears in the above-indentified patent and that said Letters Patent is hereby corrected as shown below:

Column 14

Line 29, "readjust" should read --readjusts--.
Line 44, "wear eyeglass" should read --wears eyeglasses-- and "eyeglass" should read --eyeglasses--.
Line 56, "glass" should read --glasses--.
Line 66, "Purkinje's image" should read --Purkinje images--.

Column 15

Line 45, "|k0↑" should read --|k0|--.
Line 50, "$\eta$x" should read --$\theta$x--.

Column 16

Line 39, "he" should read --the--.

Column 17

Line 13, "rotate" should read --rotates--.
Line 38, "are" should read --is--.

Column 18

Line 34, "form" should read --forms--.

UNITED STATES PATENT AND TRADEMARK OFFICE
CERTIFICATE OF CORRECTION

PATENT NO. : 5,734,930

DATED : March 31, 1998

INVENTOR(S) : SHINICHI HAGIWARA

It is certified that error appears in the above-indentified patent and that said Letters Patent is hereby corrected as shown below:

Column 19

Line 29, "compute" should read --computed--.
    Line 42, "Are" should read --are--.
    Line 51, "indicates" should read --indicate--.

Column 20

Line 34, "o" should read --of--.
    Line 62, "s" should read --is--.

Column 22

Line 6, "In" should read --If--.
    Line 18, "Since in" should read --In--.
    Line 29, "in" should read --in an--.

UNITED STATES PATENT AND TRADEMARK OFFICE
CERTIFICATE OF CORRECTION

PATENT NO. : 5,734,930  Page 5 of 5

DATED : March 31, 1998

INVENTOR(S) : SHINICHI HAGIWARA

It is certified that error appears in the above-indentified patent and that said Letters Patent is hereby corrected as shown below:

<u>Column 23</u>

Line 47, "with" should read --with a--.

<u>Column 25</u>

Line 4, "by 10" should read --by--.
    Line 67, "eye" should read --eye;--.

Signed and Sealed this

Seventeenth Day of November, 1998

BRUCE LEHMAN

*Attest:*

*Attesting Officer*     *Commissioner of Patents and Trademarks*